US006496871B1

(12) United States Patent
Jagannathan et al.

(10) Patent No.: US 6,496,871 B1
(45) Date of Patent: Dec. 17, 2002

(54) DISTRIBUTED AGENT SOFTWARE SYSTEM AND METHOD HAVING ENHANCED PROCESS MOBILITY AND COMMUNICATION IN A COMPUTER NETWORK

(75) Inventors: Suresh Jagannathan, Plainsboro, NJ (US); Richard A. Kelsey, Princeton, NJ (US); James F. Philbin, Metuchen, NJ (US); Satoru Fujita, Tokyo (JP); Kazuya Koyama, Tokyo (JP); Toru Yamanouchi, Tokyo (JP)

(73) Assignees: NEC Research Institute, Inc., Princeton, NJ (US); NEC Corporation, Tokyo (JP)

( * ) Notice: Subject to any disclaimer, the term of this patent is extended or adjusted under 35 U.S.C. 154(b) by 0 days.

(21) Appl. No.: 09/109,412

(22) Filed: Jun. 30, 1998

(51) Int. Cl.[7] .................................................. G06F 9/54
(52) U.S. Cl. ...................................... 709/317; 709/202
(58) Field of Search ................................. 709/310–317, 709/107, 314, 202; 455/432; 710/56; 711/202

(56) References Cited

U.S. PATENT DOCUMENTS

| | | | | |
|---|---|---|---|---|
| 5,368,685 A | | 11/1994 | Gosling | 395/700 |
| 5,421,015 A | * | 5/1995 | Khoyi et al. | 709/107 |
| 5,603,031 A | | 2/1997 | White et al. | 395/683 |
| 5,630,066 A | | 5/1997 | Gosling | 395/200.09 |
| 5,668,999 A | | 9/1997 | Gosling | 395/704 |
| 5,706,516 A | * | 1/1998 | Chang et al. | 709/300 |
| 5,887,171 A | * | 3/1999 | Tada et al. | 707/4 |
| 6,085,086 A | * | 7/2000 | La Porta et al. | 455/432 |
| 6,192,514 B1 | * | 2/2001 | Lurndal | 717/6 |

OTHER PUBLICATIONS

Agha, G., *Actors: A Model of Concurrent Computation in Distributed Systems*, MIT Press Publ., Cambridge, Mass., Chapter 2, pp. 5–20 (1986).

Bennett, J. K. et al., Munin: Distributed Shared Memory Based on Type–Specific Memory Coherence *Proceedings of the Second ACM SIGPLAN Symposium on Principles & Practice of Parallel Programming, reprinted in SIGPLAN NOTICES*, vol. 25, No. 3, pp. 168–176 (Mar. 1990).

(List continued on next page.)

*Primary Examiner*—St. John Courtenay, III
*Assistant Examiner*—Van H. Nguyen
(74) *Attorney, Agent, or Firm*—Andrew G. Isztwan

(57) ABSTRACT

A distributed software system and method are provided for use with a plurality of potentially heterogeneous computer machines connected as a network. The system may comprise at least one agent comprising a protection domain, wherein the protection domain of the at least one agent resides on at least two of the plurality of computer machines. A plurality of objects is contained within the protection domain of the at least one agent, a first object residing on a first of the at least two computer machines and a second object residing on a second of the at least two computer machines. The objects are selectively movable among the at least two computer machines by a programmer of the system. The first object on the first computer machine may access the second object on the second computer machine in a location-transparent or network-transparent manner; that is, without knowledge of the physical address of the second object on the second computer machine and regardless of the selective movement of either the first object or the second object among the first and second computer machines. The agent is mobile and may migrate, in whole or in part, to any other machine or machines in the network. Each distributed agent may be distributed among one, several or many of the machines of the network. Migration of agents, even during process execution, is straightforward and maintains consistency across the network. Specifically, other agents may continue to access a particular agent after it has migrated without any prior notification to the agents themselves.

69 Claims, 28 Drawing Sheets

OTHER PUBLICATIONS

Birrell, A. et al., "Network Objects," Digital SRC Research Report 115 (1995).

Birrell, A. D. et al., "Implementing Remote Procedure Calls," *ACM Transactions on Computer Systems,* vol. 2, No. 1, pp. 39–59 (Feb. 1984).

Black, A. et al., "Distribution and Abstract Types in Emerald," *IEEE Transactions on Software Engineering,* vol. SE–13, No. 1, pp. 65–76 (Jan. 1987).

Carriero, N. et al., "Piranha Scheduling: Strategies and Their Implementation," *International Journal of Parallel Programming,* vol. 23, No. 1, pp. 5–33 (1995).

Farmer, W. M. et al., "Security for Mobile Agents: Issues and Requirements," *Proceedings of the 19th National Information Systems Security Conference,* pp. 591–597, Baltimore, MD. (Oct. 1996).

Farmer, W. M. et al., "Security for Mobile Agents: Authentication and State Appraisal," *Computer Security—ESORICS 96: 4th European Symposium on Research in Computer Security Proceedings,* pp. 118–130 (Sep. 1996).

Jansen, B. et al., "ILU 1.8 Reference Manual," *Xerox Corporation* (1995).

Jul, E. et al., "Fine–Grained Mobility in the Emerald System," *ACM Transactions on Computer Systems,* vol. 6, No. 1, pp. 109–133 (Feb. 1988).

Kotz, D. et al., "Agent TCL: Targeting the Needs of Mobile Computers," *IEEE Internet Computing,* vol. 1, No. 4, pp. 58–67 (Jul.–Aug. 1997).

Kranz, D. et al., "ORBIT: An Optimizing Compiler for Scheme," *ACM SIGPLAN Notices,* vol. 21, No. 7, pp. 219–233 (Jul. 1986).

Lea, D., *Concurrent Programming in Java: Design Principles and Patterns,* Addison–Wesley Publ., pp. 1–34 (Jan. 1997).

Li, K. et al., "Memory Coherence in Shared Virtual Memory Systems," *ACM Transactions on Computer Systems,* vol. 7, No. 4, pp. 321–359 (Nov. 1989).

Mowbray, T. et al., *The Essential CORBA: Systems Integration Using Distributed Objects,* Wiley Publ., pp. 1–53 (1996).

Mullender, S. (ed.), *Distributed Systems,* ACM Press, Addison–Wesley Publ., Ch. 9, pp. 217–250 (2d ed. 1993).

Peine, H. et al., "The Architecture of the Ara Platform for Mobile Agents," Rothermel, K. et al., (eds.), *Proceedings of the First International Workshop on Mobile Agents, MA '97,* pp. 50–61 (1997).

Powell, M. et al., "Process Migration in DEMOS/MP," *Proceedings of the 9th ACM Symposium on Operating Systems Principles,* pp. 110–119 (New York, 1983).

Rogers, A. et al., "Supporting Dynamic Data Structures on Distributed–Memory Machines," *ACM Transactions on Programming Languages and Systems,* vol. 17, No. 2, pp. 233–263 (Mar. 1995).

Schroeder, M. et al., "Performance of Firefly RPC," *ACM Transactions on Computer Systems,* vol. 8, No. 1, pp. 1–17 (Feb. 1990).

Snir, M. et al., *MPI: Complete Reference,* MIT Press Publ., pp. 1–14 (1996).

Straßer, M. et al., "A Performance Model for Mobile Agent Systems," *Proceedings of the International Conference on Parallel and Distributed Processing Techniques and Applications '97,* vol. II, Editor H.R. Arabnia, pp. 1132–1140 (1997).

Vigna, G., "Protecting Mobile Agents Through Tracing," *Proceedings of the Third Workshop on Mobile Agent Systems* (Finland, Jun. 1997) (obtained from http://www.elet-.polimi.it/~vigna/pub/mos97.ps.gz on Sep. 21, 1998).

J. Gosling et al, "The Java™ Language Specification", Addison–Wesley 1996 pp. 1–6.

A.. Wollrath et al., "Java–Centric Distributed Computing", 1997 IEEE Micro pp. 44–60.

W. Clinger et al., "Revised Report on the Algorithmic Language Scheme", ACM Lisp Pointers 4(3):1–55, Jul. 1991.

H. Cejtin et al. "Higher–Order Distributed Objects", ACM Transactions on Programming Languages and Systems, vol. 17, No. 5, Sep. 1995, pp. 704–739.

L. Cardelli, "A Language with Distributed Scope", Proceedings $22^{nd}$ ACM SIGPLAN–SIGACT Symposium On Principles of Programming Languages, Jan. 22–25, 1995 pp. 286–321.

D. Wong et al., "Concordia: An Infrastructure for Collaborating Mobile Agents", in Mobile Agent: first International workshop, pp. 86–97, Springer, 1997.

D. Lange et al.,"Programming Mobile Agents in Java™— With the Java Aglet API", IMB, URL= http://www.trl.ibm-.com/aglets/agletbook, (1998).

J. White, "Mobile Agents White Paper," General Magic, URL = http://ww.generalmagic.com/technology Techwhitepaper.html (1998).

"Introduction to the Odyssey API," General Magic, URL = http://www.generalmagic.com/agents/odyssey Intro.pdf (1998).

Smith et al. "Heterogeneous Process Migration: The Tui System", IEEE, 1997.*

Theimer et al. "Heterogeneous Process Migration By Recompilation", IEEE, 1991.*

Coulouris et al. "Distributed System Concept and Design", 1996, (pp. 178–185).*

* cited by examiner

■ Object

Object with Remote Interface

□ Remote Reference

DISTRIBUTED AGENT SOFTWARE SYSTEM AND METHOD HAVING ENHANCED PROCESS MOBILITY AND COMMUNICATION IN A COMPUTER NETWORK

FIELD OF THE INVENTION

The present invention relates to the field of distributed and parallel computer software programming, and in particular to a software system including distributed agents which exhibits enhanced process mobility and communication and facilitates the construction of network-centric applications suited for both homogeneous and heterogeneous network environments.

BACKGROUND

In distributed computer systems, emphasis has traditionally been placed on issues concerning the partitioning and transmission of data among a collection of distinct computers or "machines." Typically, these systems allow code to be distributed and accessed in one of two ways. For example, in client-server systems, each machine holds code controlling the resources found on that machine. In others, the same code image is found on all machines. In either case, some form of message-passing is used to invoke operations on remote sites.

Traditionally, process mobility (i.e. moving executing processes from one machine to another) has not been an issue of significant importance. In client-server based systems, process mobility is essentially irrelevant; tasks are heavyweight (i.e. contain a large amount of state) and control resources resident on a particular machine. In systems where all machines share the same code image, process mobility may be used to help performance by improving locality and load-balancing. However, tasks typically execute heavyweight procedures, making task migration infeasible. Moreover, an efficient task migration policy that has simple, well-understood semantics has not been achieved to date.

Recently, process mobility is becoming increasingly important to the implementation of distributed computer systems. Enhanced process mobility allows computations to dynamically reconfigure themselves, taking advantage of improved data locality, and reducing the number of nonlocal communication events initiated. Several distributed system models have been developed to provide a certain measure of process mobility.

Imperative Glue Systems

Imperative "glue" systems have been developed which generally operate as seamless extensions to an existing imperative programming language and add distribution and communication support to the existing language. Unfortunately, computation in imperative languages involves frequent modifications to shared global data, which is exactly what a distributed program needs to avoid. Two basic approaches have been developed to deal with this problem: distributed shared memory (or "DSM") and remote procedure call (or "RPC").

With DSM, while the distributed nature of the computation is largely invisible to the programmer, implementation complexity is greater than in a system which uses message-passing explicitly. All data is conceptually associated with a global address. Thus, the machine where a thread executes no longer influences the behavior of the program: dereferencing a global address may involve a remote communication to the machine "owning" the contents of that address. While DSM provides a mechanism to implement parallel dialects of imperative languages in a distributed environment, programmers have little control in specifying how coherence and consistency are realized. In particular, issues of process mobility become largely irrelevant since the distribution of data and tasks is implicitly handled by the implementation, and not explicitly managed by the program. While DSM simplifies programming, it is likely to be more effective when combined with mechanisms to explicitly control distribution and communication.

RPC provides a way of breaking a program into discrete parts, each of which runs in its own address space. Unlike DSM, RPC communication is explicit in the program, so programmers have complete control over costs. However, the semantics of RPC are substantially different from that of an ordinary procedure call. In particular, when a procedure P makes an RPC call to a procedure Q, the arguments to Q are marshaled and shipped to the machine where the computation should be performed. Stub generators on procedures linked to the application program are responsible for handling representation conversion and messaging. Arguments passed to a remote procedure are passed by copying. Thus, side effects to shared structures can no longer be used for communication between caller and callee. As a result, imperative programs must be substantially modified to run in a distributed environment using RPC. Consequently, programming a distributed agent system using RPC semantics is significantly more complex and subtle than sequential programming on a serial machine.

Process mobility, the ability to migrate a thread of control (or task) along with its associated state, is especially difficult. The imperative nature of these languages means that a large percentage of data found in programs must be global. Without using RPC, communication among processes must be via side effect, and not via allocation and copy. Thus, the advantages of having mobile processes is greatly mitigated. Conceptually, processes are highly mobile in these languages because they carry no state, but because they must frequently reference global (shared) data, process migration becomes useful only if the data they access moves along with the process requiring them. Given that global data is likely to be shared among several processes, the implicit coupling of data and code in imperative languages greatly weakens the utility of process mobility in these languages.

Network-Centeric, Object Based Languages

Recently, a shift to a new computational paradigm has occurred. Instead of regarding the locus of an executing program as a single address space physically resident on a single processor, or as a collection of independent programs distributed among a set of processors, the advent of concurrent, network-centric, object-based languages, such as Java, has offered a compelling alternative. See J. Gosling et al., The Java Language Specification, Sun Microsystems, Inc. (1995), which is expressly incorporated herein. By allowing concurrent threads of control to execute on top of a portable, distributed virtual machine, a network-aware language like Java presents a view of computation in which a single program can be seamlessly distributed among a collection of heterogeneous processors. Unlike distributed systems that require the same code to be resident on all machines prior to execution, code-mobile languages like Java allow new code to be transmitted and linked to an already executing process. This feature allows dynamic upload functionality in ways not possible in traditional distributed systems.

Java incorporates computational units known as "objects." An object includes a collection of data called instances variables, and a set of operations called methods which operate on the instance variables. Object state (i.e. the instance variables) is accessed and manipulated from outside an object through publicly visible methods. Because this objectoriented paradigm provides a natural form of encapsulation, it is generally well-suited for a distributed environment. Objects provide regulated access to shared resources and services. In contrast to distributed glue languages, distributed extensions of Java permit objects as well as base types to be communicated. Moreover, certain implementations, such as Java/RMI, also permit code to be dynamically linked into an address space on a remote site.

Since a primary goal of Java is to support code migration (note that code migration is conceptually distinct from process mobility, since code migration makes no assumption about the data to be operated by the instructions in the code being migrated) in a distributed environment, the language provides a socket mechanism through which processes on different machines in a distributed network may communicate. Sockets, however, are a low-level network communication abstraction. Applications using sockets must layer an application-level protocol on top of this network layer. The application-level protocol is responsible for encoding and decoding messages, performing type-checking and verification, and the like. This arrangement has been found to be error-prone and cumbersome. Moreover, Java only supports migration of whole programs. Threads of control cannot be transmitted among distinct machines. RPC provides one way of abstracting low-level details necessary to use sockets. RPC is a poor fit, however, to an object-oriented system. In Java, for example, communication takes place among objects, not procedures per se. Java/RMI, described for example in A. Wollrath et al., "Java-Centric Distributed Computing," IEEE Micro, Vol. 2, No. 72, pp. 44–53 (May 1997), is a variant of RPC tailored for the object semantics defined by Java's sequential core. Instead of using procedure call as the basis for separating local and remote computation, Java/RMI uses objects. A remote computation is initiated by invoking a procedure on a remote object. Clients access remote objects through surrogate objects found on their own machines. These objects are generated automatically by the compiler, and compile to code that handles marshalling of arguments and the like. Like any other Java object, remote objects are first-class, and may be passed as arguments to, or returned as results from, a procedure call.

Java/RMI supports a number of features not available in distributed extensions of imperative languages or distributed glue languages. Most important among them is the ability to transfer behavior to and from clients and servers. Consider a remote interface I that defines some abstraction. A server may implement this interface, providing a specific behavior. When a client first requests this object, it gets the code defining the implementation. In other words, as long as clients and servers agree on a policy, the particular mechanism used to implement this policy can be altered dynamically. Clients can send behavior to servers by packaging them as which can then be directly executed on the server. Again, if the procedure to be executed is not already found on the server, it is fetched from the client. Remote interfaces thus provide a powerful device to dynamically ship executable content with state among a distributed collection of machines. Java/RMI allows data as well as code to be communicated among machines in a Java ensemble. Such extensions permit Java programmers to view a computation not merely as a single monolithic unit moving from machine to machine (such as in the form of applets), but as a distributed entity, partitioned among a collection of machines. By using an architectureindependent virtual machine, information from one process can be sent to another without deep knowledge of the machines on which each process is executing or the underlying network infrastructure connecting these pieces together.

Java/RMI can be difficult to use, however. Remote objects are implicitly associated with global handles or uids, and thus are never copied across nodes. However, any argument which is not a remote object in a remote object procedure call is copied, in much the same way as in RPC. As a result, remote calls have different semantics from local calls even though they appear identical syntactically. The fact that Java is highly imperative means that distributed programs must be carefully crafted to avoid unexpected behavior due to unwanted copying of shared data.

In addition, neither Java nor Java/RMI permit an object to simultaneously span multiple heterogeneous machines. Each object is resident on exactly one machine at any given time. As a result, true concurrency on multiple machines within the encapsulation of a single object is impossible. Moreover, like a typical RPC system, communication among tasks using RMI is through copying. Thus, the semantics of a Java/RMI program may be quite different from a syntactically similar Java program.

Agent Languages

Besides RPC and Java, numerous proposals have been made for agent languages which allow computation and data to freely migrate within a network. Conceptually, an agent is an encapsulation of a computation (i.e. a task) and related data that is mobile (i.e. can freely move about within a distributed network of machines).

For example, Aglets, described for example in D.B. Lange et al., "Programming Mobile Agents in Java—With The Java Aglet API", IBM, (1998), is a Java mobile agent system that uses the Java/RMI interface and a security manager to achieve a portable and secure agent system. However, Aglets do not permit an agent's state to simultaneously span multiple heterogeneous machines, and migration of an agent requires the entire agent to move from one machine to another.

Telescript and Odyssey are two other mobile agent languages. See J. White, "Mobile Agents White Paper," General Magic, (1998); "Introduction to the Odyssey API," General Magic, (1998). While both Telescript and Odyssey agents can migrate during execution, the state of such agents can only reside on a single machine at any given moment. Thus, Telescript and Odyssey agents do not allow distributed state: when an agent moves, it is necessary that its entire state moves along with it. This limitation significantly reduces functionality and efficiency. In the case of Odyssey, only the state as found in the heap can move—the state of the stack, program counter, and registers are all lost. Telescript imposes similar restrictions.

Other systems that support mobile computation are Agent Tcl (see D. Kotz et al., "AGENT TCL: Targeting the Needs of Mobile Computers," IEEE Internet Computing, Vol. 1, No. 4, pp. 58–67 (1997)) and ARA (see H. Peine et al., "The Architecture of the ARA Platform for Mobile Agents," Proceedings of the First International Workshop on Mobile Agents (K. Rothermel et al., eds.), pp. 50–61 (1997)), whose base languages were originally Tcl but who have recently been provided Java support. Like Odyssey and Aglets, these systems also prohibit an agent from having distributed state, and provide no infrastructure by which an agent can transparently access data resident on another machine.

Obliq (see L. Cardelli, "A Language with Distributed Scope," Proceedings of the 22nd ACM Symposium on Principles of Programming Languages, pp. 286–298 (1995)) and Kali (see H. Cejtin et al., "Higher-Order Distributed Objects," ACM Transactions on Programming Languages and Systems, Vol. 17, No. 5, pp. 704–739 (1995)) are two other programming languages that permit code and data to migrate within a heterogeneous network. Obliq's sequential semantics is a delegation-based object system, whereas Kali is built on top of Scheme (see W. Clinger et al., eds. "Revised Report on the Algorithmic Language Scheme," ACM Lisp Pointers, Vol. 4, No. 3, pp. 1–55 (July 1991)), a higher-order lexically-scoped dialect of Lisp. Neither of these two systems have an explicit notion of agents, however. While Obliq supports transparent references, it does so by severely restricting the conditions under which objects may migrate. Moreover, Obliq does not provide a notion of a distributed address space such as an agent. Kali requires all operations on remote references to be explicitly performed. Like Obliq, Kali does not support an object-based encapsulation model. These limitations make Obliq and Kali ill-suited for large-scale distributed systems with mobile applications.

Accordingly, there remains a need for a distributed computing system which is easy to program and which: (1) provides an object-based encapsulation model, such as an agent, which allows the processes and state of the agent to be distributed over multiple potentially heterogeneous machines; (2) enables transparent access of data resident on another machine; and (3) allows easy and efficient process migration, in whole or in part, among distinct machines.

SUMMARY OF THE INVENTION

Generally speaking, in accordance with the invention, a distributed software system for use with a plurality of computer machines connected as a network is provided. The system may comprise a plurality of bases, each base providing a local address space and computer resources on one of a plurality of computer machines. At least one agent comprising a protection domain is provided, wherein the protection domain of the at least one agent resides on at least one of the plurality of bases. A plurality of objects are contained within the protection domain of the at least one agent, a first object residing on a first base of the plurality of bases and a second object residing on a second base of the plurality of bases. The first object on the first base may access the second object on the second base without knowledge of the physical address of the second object on the second base. Finally, at least one runtime system is connected to the first base and the second base. The runtime system facilitates migration of agents and objects from at least the first base to at least the second base.

In another embodiment, the system may generally comprise at least one agent comprising a protection domain, wherein the protection domain of the at least one agent resides on at least two of the plurality of computer machines. A plurality of objects is contained within the protection domain of the at least one agent, a first object residing on a first of the at least two computer machines and a second object residing on a second of the at least two computer machines. The objects are selectively movable among the at least two computer machines by a programmer of the system. The first object on the first computer machine may access the second object on the second computer machine in a location-transparent or network-transparent manner; that is, without knowledge of the physical address of the second object on the second computer machine and regardless of the selective movement of either the first object or the second object among the first and second computer machines. The agent is mobile and may migrate, in whole or in part, to any other machine in the network. Moreover, the machines in the network may be either homogeneous or heterogeneous.

The invention further includes a method for implementing a network-centric computer software programming system for a network comprising a plurality of computer machines. The method includes defining a plurality of object-oriented classes including an object class, an agent class, a base class and a task class; defining an object migrate method in the object class that migrates a selected object instance to a location specified with the base class; defining a task migrate method in the task class that migrates a selected task represented in a task instance to a location specified with the base class; defining an agent migrate method in the agent class that migrates a selected agent process to a location specified with the base class, including migration of all object instances and task instances within the agent; instantiating a first agent process according to the agent class, the first agent process including a plurality of task instances and object instances and distributed among the plurality of computer machines; and performing the object migrate method, the task migrate method and the agent migrate method within the first agent process. Thus, the invention provides for partial or total migration of agents which are distributed among various machines of the network.

Each distributed agent of the present invention may accordingly be distributed among one, several or many of the machines of the network, enabling greater concurrency of operation while simultaneously maintaining a protected, encapsulated software structure which protects tasks and data within the agent (which themselves may be distributed among the machines of the network) from interference by other tasks and data operating in the network and on the same machines wherein such tasks and data reside, in particular. Migration of such agents, even during process execution, is straightforward and maintains consistency across the network. Specifically, other agents may continue to access a particular agent after it has migrated without any prior notification to the agents themselves.

Accordingly, a principal object of the present invention is to provide a distributed agent system wherein an agent may have its tasks and state distributed among multiple potentially heterogeneous physical machines within a network.

Another object of the present invention is to provide a distributed agent system which is network-transparent, wherein references to objects within an agent, including objects residing on distinct physical machines, do not require knowledge of the physical location or address of the object and may instead be made using symbolic references.

Yet another object of the present invention is to provide a distributed agent system in which references to objects within an agent are resolved by the system transparent to the programmer and to the agent.

A further object of the present invention is to provide a distributed agent system which provides selectable, location-independent method execution.

A still further object of the present invention is to provide a distributed agent system which allows easy and efficient runtime process migration, in whole or in part, among distinct machines.

A still further object of the present invention is to provide a distributed agent system which is easy to program.

Other objects of the present invention will become more readily apparent in light of the following description in conjunction with the accompanying drawings.

DETAILED DESCRIPTION OF THE PREFERRED EMBODIMENTS

Generally speaking, the invention is implemented in an object-oriented language. For example, the invention may be implemented in conjunction with the Java language. To facilitate the description herein, descriptions of language syntax and core semantics are written so as to generally resemble Java, and certain Java terminology is used (e.g. "static methods," "instance fields," "self," etc.) and will be obvious from the context. It should be noted, however, that the invention is not limited to a Java implementation and may be implemented in any suitable object-oriented language.

To assist the reader in understanding the following description, the following definitions are useful:

"Object": An object is an instance of a class, and represents a primitive storage unit for any kind of information.

"Object space": An object space is a collection of objects and tasks that may freely reference one another.

"Protection domain": A protection domain is a software structure which prevents unauthorized access to the data within it by computation executing outside the protection domain.

Basic Structure

Figure 1:
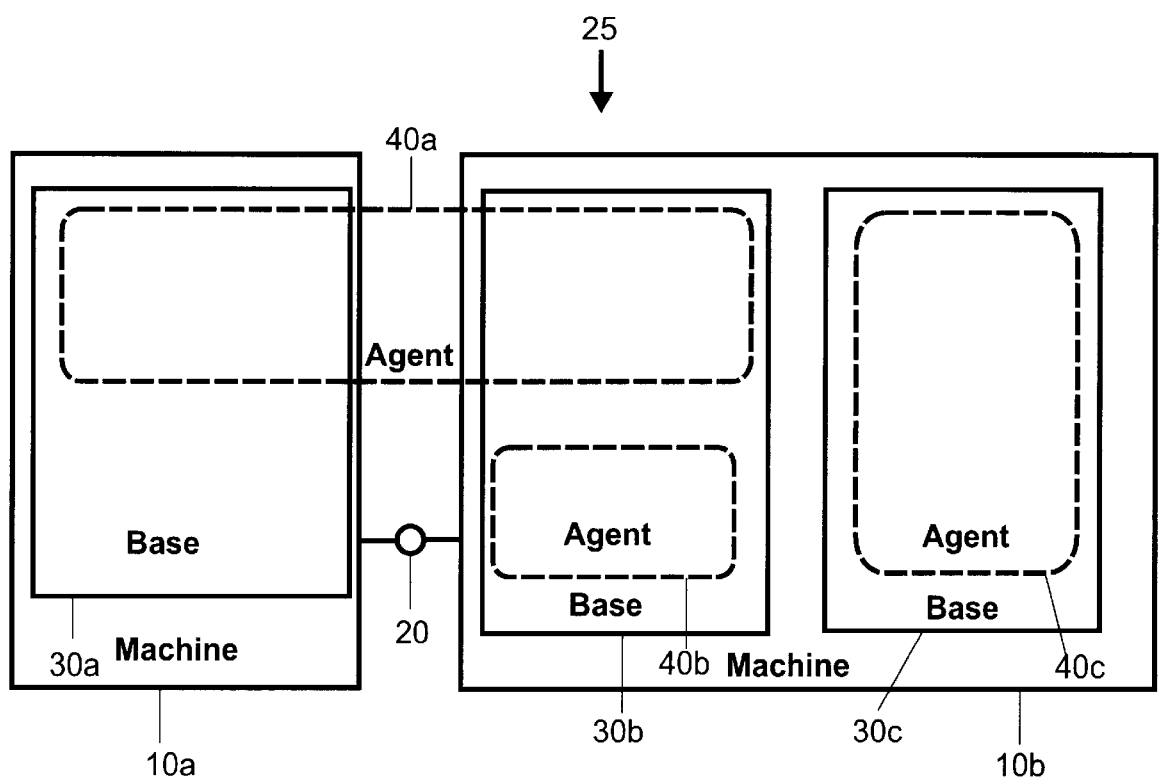
FIG. 1 is schematic diagram showing basic components of a distributed agent system according to the present invention.

Reference is now made to FIG. 1, which depicts basic architectural components of the unique distributed agent model of the present invention. A plurality of nodes or machines 10, such as machines 10a and 10b, are connected to each other through a communication interface 20 to form a network 25. Machines 10a and 10b may be homogeneous or heterogeneous machines. Each machine includes one or more "bases" 30, such as bases 30a, 30b and 30c. Agents 40, such as agents 40a, 40b and 40c, are also provided, each of which runs on one or more bases 30.

Each base 30 has a unique identifier and provides a local address space and resources on a machine 10. Each base is preferably implemented as an operating system-level process, such as a UNIX process or Windows process. In the simplest case, a base runs on one processor; however, a base may also run on multiple processors if the underlying operating system allows processes to execute on multiple processors, as is possible on shared-memory multiprocessors. Additionally, multiple bases may run on the same machine. For example, in FIG. 1, bases 30b and 30c are shown running on the same machine 10b.

Each agent 40 is a mobile software component that serves as both a global object space and a protection domain. An agent 40 manages a set of objects that all reside in the same consistent and unique object space. Each agent 40 encapsulates a collection of objects, including simple objects (such as data objects) as well as a collection of threads or concurrently executing tasks. Each agent 40 runs on one or more bases 30, and several agents 40 or several parts of agents may simultaneously reside on the same base 30. Thus, agents of the present invention may reside on one or more bases and also on one or more distinct machines. Accordingly, an agent's state may itself be distributed over a collection of distinct machines. The details of components necessary to implement such agents are described below in the section entitled "Runtime Data Structure."

The agent metaphor allows programmers to write mobile code systems that perform their tasks in autonomous ways. Unlike prior art agents, the agents of the present invention encapsulate both concurrent, distributed tasks and data. In other words, an agent's state may be truly distributed within a network. References to data within an agent do not require knowledge of the physical location where the data resides, so objects within agents may be accessed in a network-transparent manner. As a result, network-centric software is rendered easy to write and maintain. Because references among objects within an agent are location- or network-transparent, the agents of the present invention can be thought of as providing a "shared memory" abstraction in a distributed network environment. Moreover, the agents of the present invention also offer enhanced modularity and protection facilities by providing encapsulation of tasks and data which preferably prohibits transparent access of tasks and data in one agent from other agents as will be discussed in greater detail below.

Moreover, multiple agents may be created within a network system, and the distribution of agents and even portions of agents (called "subagents") among the machines of the network may be altered dynamically through migration as will be discussed in more detail below. Further, since each agent can contain multiple tasks, a single mobile software component (the agent) can execute tasks simultaneously on different, potentially heterogeneous, machines, thereby enabling greater concurrency within a single mobile software component.

Communication Between Objects

With regard to communication between objects within the same agent ("intra-agent communication"), the encapsulation provided by each agent and the potentially distributed nature of each agent of the present invention provides important benefits. In particular, objects within a particular agent's object space may be transparently accessed by other objects in the same agent regardless of which base (and therefore regardless of which machine) they reside on. In other words, an object can access any other object in the same agent whether that object is on the same or some other machine in the network and without manifest knowledge of the physical location where that object resides.

Communication between objects residing in different agents ("interagent communication") is preferably governed as follows. All objects are assigned global identifiers. However, only those objects which implement a special "Remote" interface can be accessed from outside the agent to which they belong. When a objects implementing a Remote interface are passed as arguments to remote procedures, remote references to the objects are supplied. When other objects (i.e. objects not implementing a Remote interface) appear as arguments, copies of these objects are passed. The semantics of such a Remote interface may be similar to the Java/RMI specification, for example.

Figure 2:
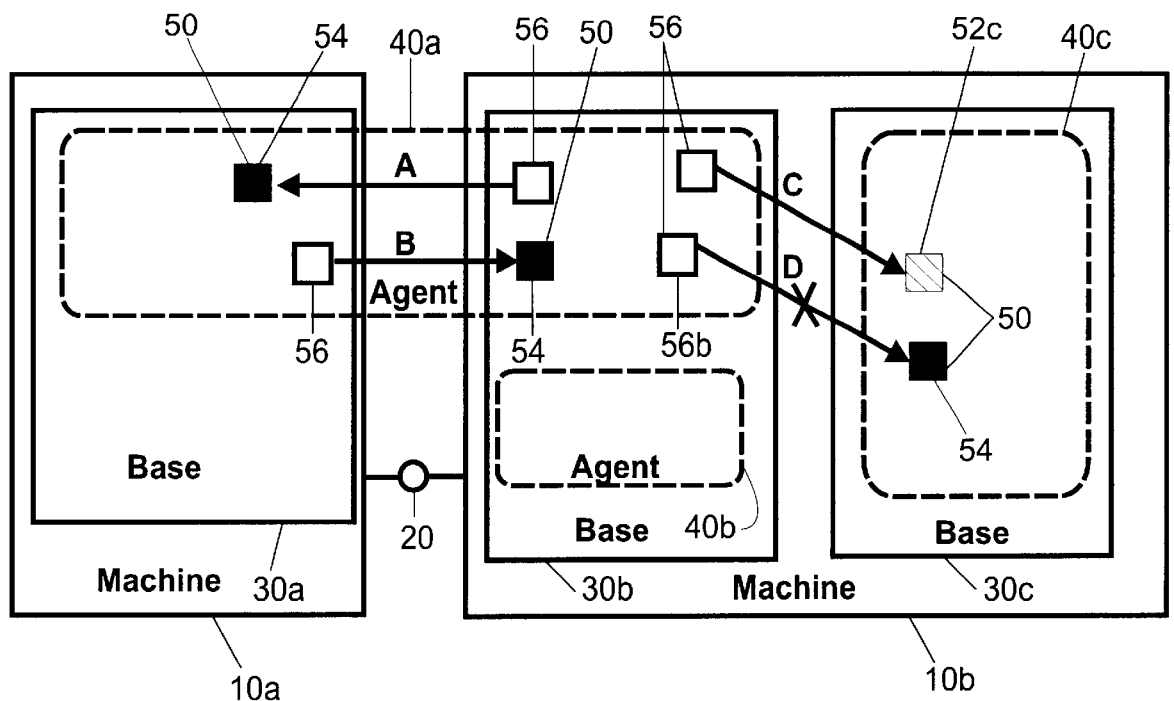
FIG. 2 is a schematic diagram showing communication between objects within the same agent as well as communication between objects in different agents in a distributed agent system according to the present invention.
Figure 2:

The above-described intra-agent and interagent communication arrangements are generally illustrated in FIG. 2. In the figure, two bases 30*b* and 30*c* are located on machine 10*b*, and agent 40*a* resides on multiple bases 30*a* and 30*b* running on distinct machines 10*a* and 10*b*, respectively. Each agent 40 includes one or more objects 50. Objects implementing a Remote interface are represented by a rectangle containing cross-hatching and are designated by reference numeral 52, while objects not implementing a Remote interface are represented by a solid black rectangle and are designated by reference numeral 54. Remote references to objects are represented by an unshaded rectangle and are designed by the reference numeral 56. Arrows represent dependencies between references and the object the reference.

Communication across bases but within an agent is performed by remote reference, as shown by arrows A and B in FIG. 2, in which any kind of object may be accessed and modified consistently. A remote reference can be thus viewed as merely a stub to the actual object it references. This implementation guarantees that access of a remote reference will entail communication with the machine on which the object actually resides, and such communication may serve to access relevant data or initiate a new computation. As noted above, the portions of a single agent found on separate bases are known as subagents. Within a subagent (that is, within an agent on the same base), shared data found on the same subagent may be accessed with local references.

On the other hand, communication between agents is performed by using a remote reference if the object implements a Remote interface, or otherwise by copying. Arrow C refers to an object 52*c* having a Remote interface in another agent, so this reference is valid, while arrow D refers to an object 56*b* without a Remote interface in another agent, so this reference would be invalid. In order to avoid creating this invalidity, whenever an object without a Remote interface appears as an argument or a return value of a procedure call, a copy of the object should be passed. Communication between agents is described in more detail below.

Object Space

Conceptually, tasks access data within an agent through a global object space that defines a mapping between a remote reference to an object (e.g. the name of the object) and the object's physical location on a machine in the system.

Figure 3:
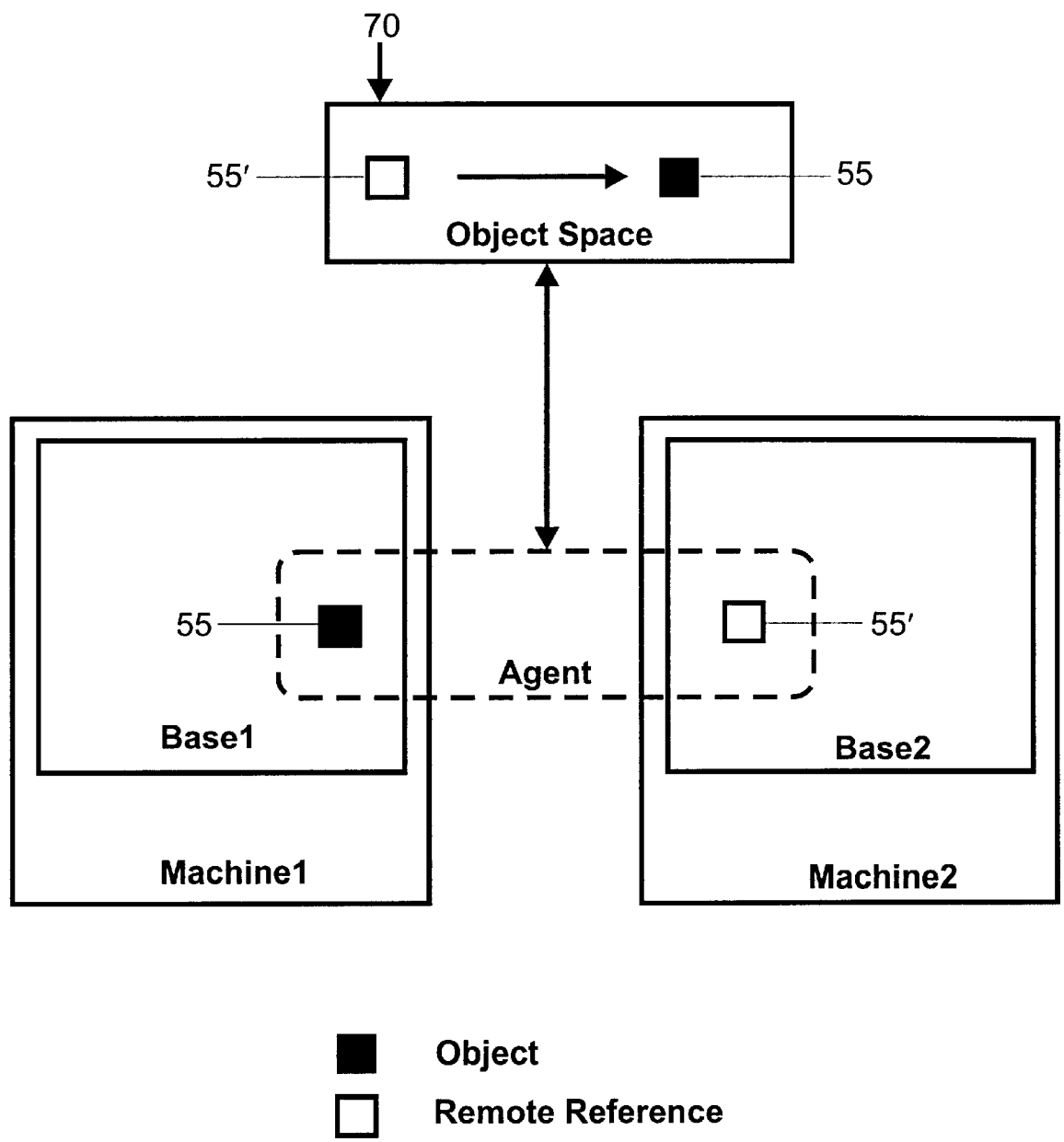
FIG. 3 is a conceptual diagram showing the operation of an object space in a distributed agent system according to the present invention.

FIG. 3 shows a conceptual, diagrammatic view of the operation of an object space. A single agent, Agent, spans two bases, Base1 and Base2, on two machines, Machine1 and Machine2. When an object 55 is created in the Agent on Base1 and Machine1, its identity and location are recorded in Agent's object space 70, together with a symbolic (or remote) reference 55' to object 55. Subsequent references to object 55 may be made using symbolic reference 55', which are handled by the system by querying the object space 70 and resolving the symbolic reference 55' to the appropriate physical location for object 55. Thus, object space 70 enables transparent access to elements in Agent which spans across multiple physical machines. In particular, references in Base2 on Machine2 to object 55 on Machine1 may be made using the symbolic reference 55'. Thus, references to data (regardless of whether they are local to a base or found on another base) do not require knowledge of the physical location where the data resides.

In practice, the use of a globally-accessible physical object space (such as shared memory) to mediate all references to data within an agent is possible but may be prohibitively expensive. A more efficient representation of the object space used by the present invention uses global identifiers as the primary addressing technique for object spaces and will be discussed below (see subsection entitled "Global Id").

Agent and Object Migration

A particularly useful feature of the present invention is program mobility. The distributed agent system of the present invention incorporates several user-level migration methods for agents and objects, and one system-level migration method for threads. Migration is important to the invention since it is an important means by which mobility is realized. Unlike other agent systems, the present invention, as a consequence of its distributed agent metaphor, allows any object, and not just agents, to move freely about a network ensemble during runtime. Thus, mobility is realized at both the agent and the object level. Tasks and data may freely and dynamically migrate among the machines in the network associated with creating their agent. By allowing objects and agents to migrate, the invention provides a degree of adaptability and flexibility heretofore unachieved by the prior art.

Agent migration causes an entire agent of the present invention to be moved in a single atomic step. When an agent consists of multiple threads executing on different bases and an agent migration method is called, all of these threads are preferably gathered at one of the bases before migrating to the target base. Object migration permits internal data and associated threads to migrate. (Further details are provided below in the section entitled "Runtime System.")

It should be noted that in certain situations, some types of migration may be undesirable. To accommodate these scenarios, the invention provides an "Anchored" property for use when instances of the class implementing it are statically dependent on process-specific objects, such as I/O ports or interface objects to existing software. These objects should not migrate even if the agent which encapsulates them does. The invention also provides a "Pinned" property for objects, which is similar to the Anchored property but expresses a dynamic constraint. For example, when an object temporarily requires significant communication to a specific location, it can first migrate to that location, set a Pinned property, and then communicate efficiently. During this period, the object cannot be moved. If the object must migrate again, its Pinned property must first be reset.

Figure 4A:
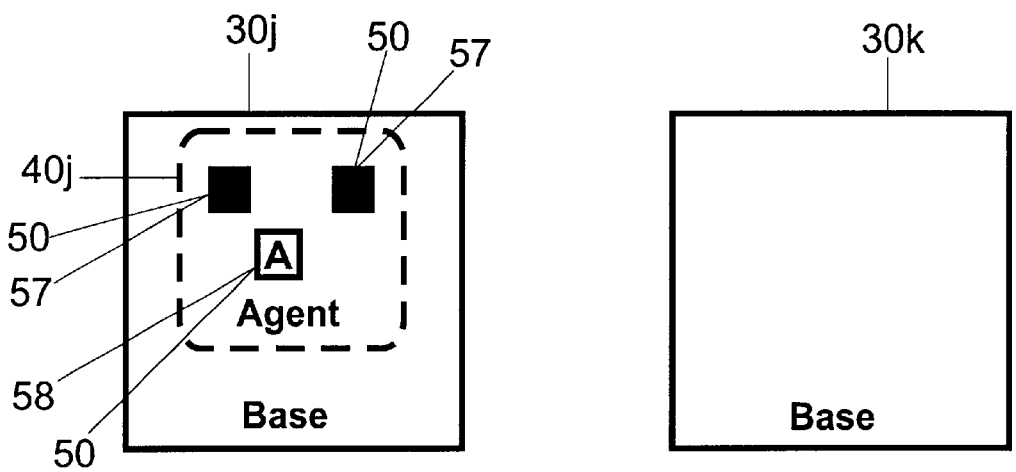
FIG. 4A is a schematic diagram showing an agent on a source base prior to migration to a destination base in a distributed agent system according to the present invention.
Figure 4B:
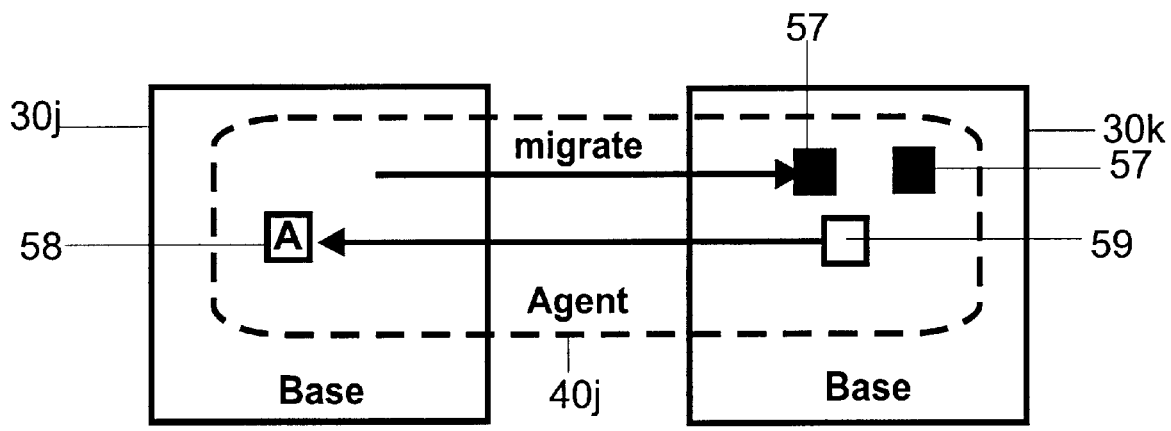
FIG. 4B is a schematic diagram showing weak migration of an agent from a source base to a destination base in a distributed agent system according to the present invention.
Figure 4C:
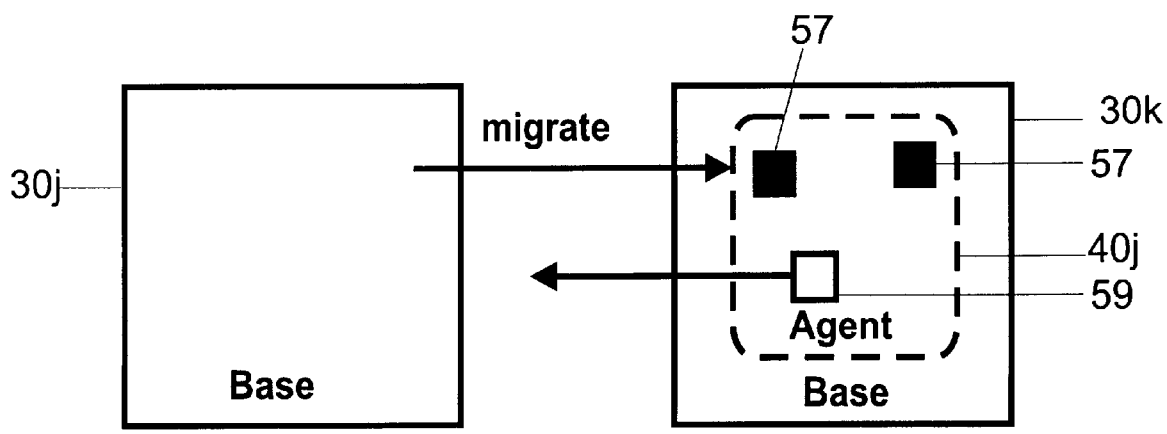
FIG. 4C is a schematic diagram showing complete migration of an agent from a source base to a destination base in a distributed agent system according to the present invention.

As noted above, agent migration results in all of an agent's elements, such as objects and threads, being moved except for anchored or pinned objects. The invention provides for two types of agent migration: weak migration and complete migration. Agent migration is illustrated in FIGS. 4A–4C. FIG. 4A shows an agent 40j residing on a base 30j prior to migrating to a target base 30k. Agent 40j contains several objects 50, including several migratable objects 57 and an anchored object 58.

FIG. 4B shows the results of agent 40j migrating under weak migration. In weak mode, anchored or pinned objects remain at the original location and are accessed with remote references in order to maintain consistent values. Thus, as shown in FIG. 4B, after migration agent 40j spans both base 30j and base 30k (the portion of agent 40j on each base is a subagent). Migratable objects 57 are moved to destination base 30k, but anchored object 58 remains at base 30j, and a remote reference 59 is created within agent 40j on base 30k for accessing the anchored object on base 30j. Although the anchored or pinned objects remaining on a base from which an agent has migrated might not be accessed beyond a firewall as the agent migrates across the firewall, these anchored or pinned objects can reconnect to the agent if the agent returns to the original base.

FIG. 4C shows the results of agent 40j migrating under complete migration. Complete migration discards all anchored or pinned objects on the original base. Thus, as shown in FIG. 4C, agent 40j has moved from base 30j to base 30k, taking migratable objects 57 with it. Anchored object 58 is discarded from base 30j. A remote reference 59 to the discarded anchored object 58 would accordingly be invalid. Complete migration is useful when an agent resides on a service provider base, and the base does not permit the agent to leave any objects behind when it migrates. Complete migration does not keep network-transparent accesses to all objects, so some care must be taken when using complete migration.

While agent migration moves an entire agent to the destination base, base-specific agent migration just moves objects in the specified base of the agent. This is useful when an agent is distributed among several bases and a programmer desires that objects in a particular base to move to another base. If these objects move to a base already containing the agent, objects residing on the base and objects moving to the base are merged.

Object migration is the movement of an object to another base, which may necessitate moving related objects and threads as well. For example, threads associated with a migrating object implicitly move to the base to which the object migrates if they execute (or are currently executing) a method on that object. Threads or other objects may freely migrate among machines. If the object space associated with the agent within which the threads are currently executing spans the target base, migration is a simple matter of copying state into the subagent on the target base. However, if no subagent exists on the target base, a new one must be first created before migration commences.

Figure 5:
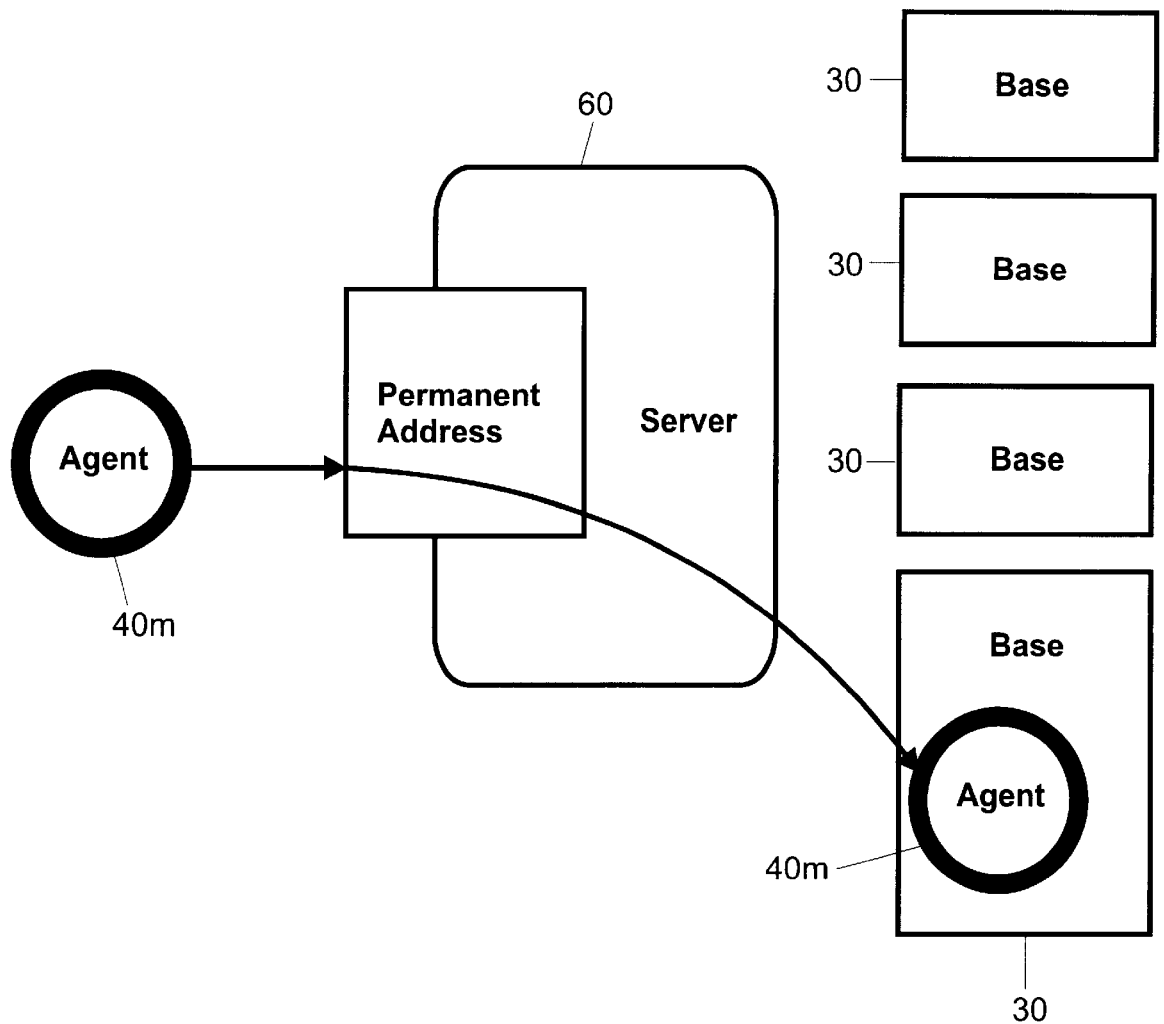
FIG. 5 is a schematic diagram showing a server handling a request for an agent to migrate to a particular base served by the server in a distributed agent system according to the present invention.

Bases are preferably managed by a server. A server is a service provider that has a permanent address, and handles service requests intended for other bases that actually execute the services. For example, as shown in FIG. 5, a server 60 may handle a service request for an agent 40 m to migrate to one of several bases 30 managed by server 60.

As a consequence of the shared memory abstraction provided by the agents of the present invention, tasks and data may freely migrate from one machine to another within an agent. Migration is semantics-preserving: moving threads or objects only has performance implications. In other words, all objects have global identity. The semantics and implementation of the present invention thus provide greater uniformity of expression and greater functionality than the prior art. As noted above, due to the global object space of each distributed agent, knowledge of the physical location or address of an object is not necessary (i.e. need not be manifested in the source program). Therefore, in order for an object to migrate, it is only necessary to appropriately update the object space for that object to reflect the object's destination after migration. This same mechanism makes partial migration (migration of less than an entire agent, such as a subset of the objects or tasks within the agent) feasible and highly effective in the present invention.

Network transparency implies object mobility. A mobile or movable object in the invention can be selectively moved among subagents (where a subagent is the portion of an agent resident on a particular base) by a programmer. A mobile object which migrates from one machine to another can still be accessed using its global identity managed by the agent's object space. In contrast to distributed shared memory systems, task and data movement among machines can be explicitly and selectively controlled by the programmer, and the transparent access of such objects within an agent is maintained regardless of the movement of the objects among the machines but within the agent. In this sense, the agent model presented in this invention is a significant refinement over a distributed shared memory model.

Moreover, in sharp contrast with the prior art (where only total migration of an agent was possible, and where no other agent knew the destination of a migrated agent and could no longer communicate with it without static references written into the source program), the present invention allows any agent within the system to access any other agent (or subagent) regardless of migration by merely consulting that agent's object space.

Figure 6:
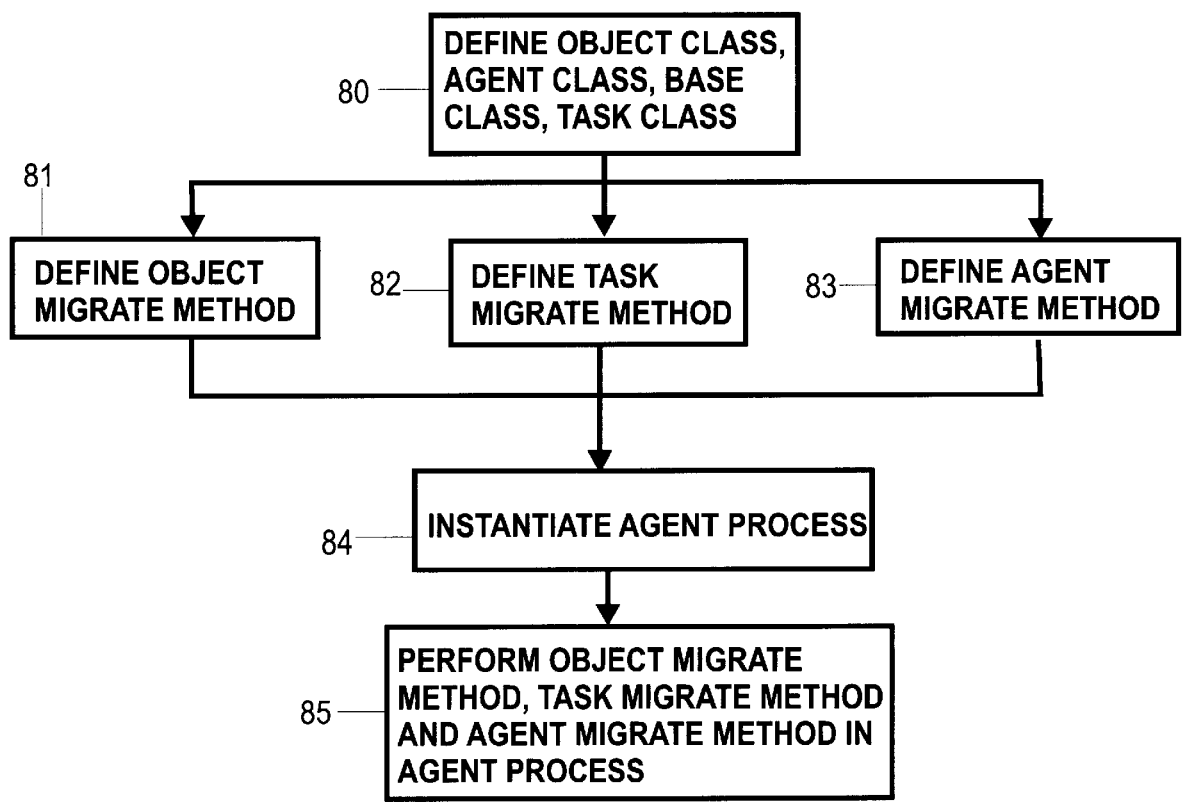
FIG. 6 is a flow diagram showing an exemplary method for implementing the network-centric migration of the present invention.

An exemplary method for implementing the network-centric migration of the present invention among a network comprising a plurality of computer machines is shown in FIG. 6. First, a plurality of object-oriented classes, including an object class, a base class, an agent class and a task class, are defined in a step 80. Next, an object migrate method is defined in the object class in a step 81. When called, the object migrate method migrates a selected object instance to a location specified with the base class (i.e. a base instance). In a step 82, a task migrate method is defined in the task class which, when called, migrates a selected task instance to a location specified with the base class. Similarly, in a step 83, an agent migrate method is defined in the agent class which, when called, migrates a selected agent process to a location specified with the base class.

After the migrate methods have been defined, an agent process is instantiated according to the agent class in a step 84. The agent process may include or encapsulate task instances instantiated according to the task class and object instances instantiated according to the object class. The agent instantiated in step 84 is distributed among the plurality of computer machines of the network, so the task instances and object instances, like the agent process itself, may similarly be distributed among the computer machines of the network. In a step 85, the object migrate method, task migrate method and agent migrate method are performed within the agent process. It should be noted that the methods performed during step 85 need not be performed in any particular order, and each may be performed multiple times, if desired. Moreover, only some of the migrate methods may be defined and performed, if desired.

Method Call Models

In an object-oriented language, an object defines a collection of data and operations called methods or procedures to manipulate that data. A method call invokes a method on some arguments. In a distributed object-oriented language like that used in the present invention, a method call may span machine boundaries: that is, the machine where the call is made may be different than the machine where the object containing the called method resides.

The present invention provides two different ways or protocols for executing methods. These two protocols derive from the fact that the caller of a method and the callee object may not be physically located on the same machine. Before describing these two calling protocols, it is useful to first explain fast and slow access modes to objects. In the fast access mode, an object field is accessed without checking and dereferencing the object's identity in the object space. Such an operation is only valid if the object is guaranteed to be present on the caller's base. In this case, the object is accessed through an ordinary addressing scheme. In the slow access mode, an object's global location must be checked via the object space and dereferenced every time one of its components is accessed.

In order to utilize these two access modes, the present invention defines the following two calling protocols:

(1) An "RPC Model" (remote procedure call model) utilizes the fast access mode. A method runs on the base where the self object that owns the method resides, so that field accesses of the object can always be done in fast mode. No dereferencing of the object's global identity is required.

(2) An "Invoker Model" realizes the slow access mode. A method runs at the caller base and does not require that the self object be on the same base, so field accesses require dereferencing before actually accessing. The invoker model allows code to be run at the calling or called location; that is, on different machines within the same agent.

Although the use of one or the other of these protocols impacts efficiency; neither of the two protocols influences program behavior.

Figure 7:
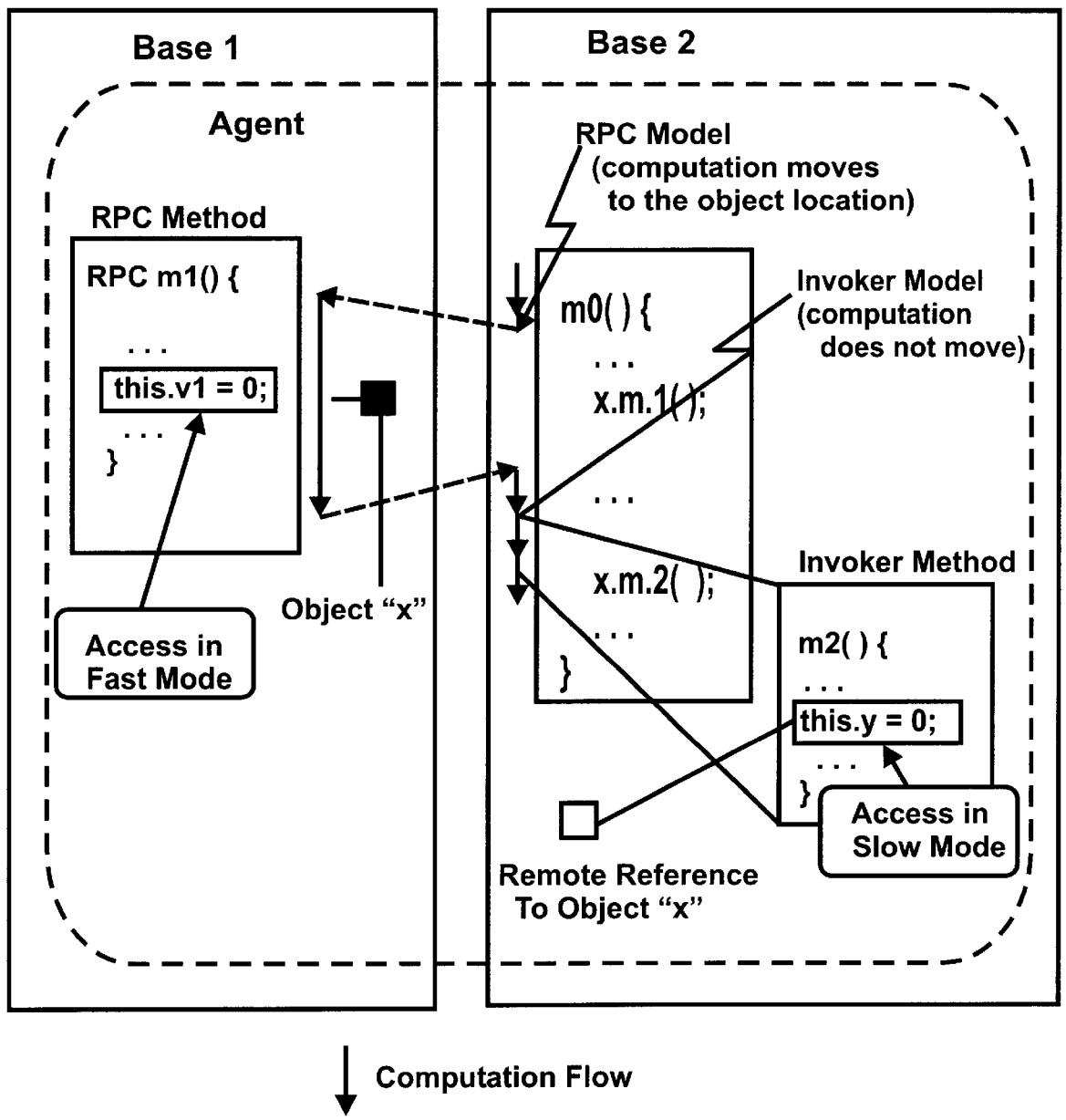
FIG. 7 is a schematic diagram of an agent running on two separate bases, and illustrating method calls under both an RPC model and an invoker model in a distributed agent system according to the present invention.

The RPC Model and Invoker Model are illustrated in FIG. 7. A single agent spans two bases, Base1 and Base2. A method m0( ) is running on Base2. Method m0( ) calls a method x.m1( ) which is associated with an object x on Base1. Under the RPC model, computation in method m0( ) moves from Base1 to Base2 where object x and the associated method x.m1( ) resides. That is, the method x.m1( ) executes on Base1 though it was called by a method running on Base2. Field accesses, such as the statement "this.v1=0;", can be performed as a local computation requiring no communication between the bases. After method x.m1() is completed, control return to method m0( ) on Base2. Next, a second method, x.m2( ), associated with object x on Base1 is called under the invoker model. A remote reference to object x is created on Base2, and method x.m2( ) is run on Base2 rather than on Base1. Field accesses, such as the statement "this.y=0;", require initiation of a communication event between Base1 and Base2.

Special cases for method calls include constructor methods or instance methods of a class implementing either an Anchored or a Remote interface. A constructor method is always called in the RPC model, since it might have location-dependent initialization. The instance native method to anchored objects must always be called in the RPC model, since the semantics of the instances are dependent on their locations. The interface method to a remote object is called in one of the bases on which the agent that has the actual object resides.

Programmers may also explicitly specify a base where an invoker method call should be executed using a method name with an '@ [base]' expression, although the invoker method is executed in a caller base by default. In this call, the caller base, the base on which the instance resides, and the base on which the method is executed might be different, but this does not raise an error since the instance methods and fields are always accessed using the slow access mode.

The language of the present invention preferably assumes the following default behavior:

(1) Unless specified otherwise, methods are always called in the invoker model.

(2) When a programmer specifies an RPC method modifier to a method, the method directly accesses instance fields of self objects in the fast mode, though realization of this protocol requires execution to move to the base where the associated object resides.

(3) RPC modifiers can also be applied to static methods. In this case, static methods are called at the location where the class object is, and then the methods access static fields in the fast mode.

Communication Between Agents

An agent of the present invention communicates with another agent by invoking interface methods of remote objects, for example in much the same way as Java's RMI. First, an interface that extends a Remote interface is defined with the signatures of instance methods that may be called from remote agents. Second, a class that implements the above interface is defined with the implementation of the methods. Third, an instance object created from the above class is recorded in either the agent's own registry or the global registry agent. Fourth, a remote agent looks up an object in the registry and receives the object reference to the actual object. Finally, the remote agent may call the instance method of the remote object in the RPC model, which is always applied to the remote method calls across agents.

Once the object reference is passed to the remote agent, the remote instance call may pass more remote object references via arguments to the remote agent and get another remote reference in a return value, so separate agents can be tightly coupled with many object references. The arguments and the return values are passed by reference when the objects implements a Remote interface. Otherwise, they are passed by value (a deep copy of the original). When objects are copied, the consistency of the field values in the objects is not maintained across agents.

Dynamic Linking

The present invention allows new class definitions (i.e. code) to be dynamically injected into a running program. This feature allows applications to incrementally enhance their functionality without requiring their reexecution. The structure of the class loader that provides this feature is similar to related mechanisms found in other languages that provide dynamic linking of new code structures (e.g. Scheme or Java). However, the introduction of a distributed object space raises issues not relevant in previous work.

Due to the distributed object semantics of the present invention, an agent has more than one class loader that control how and where to load classes. The first class loader that is created at the beginning of execution is preferably linked to the base where the agent starts to run, so that user-defined classes are loaded from the base by default. However, when an object migrates to a new base where the object's class has not yet been loaded, the class cannot be loaded from this new base but must be transferred from the source base (on which the object was originally created) to the destination base.

Class loaders also manage class objects. Though it is not necessary that all class objects reside on the same base as the class loader, the class loader must know if a class object is already created, or where the actual class objects are, so that it can observe the rule that each class has only one class object for a class loader. If a user-defined class file is located in a specific local disk that is different from the base on which an agent starts to run, and a programmer wishes to load the class, the programmer may use a base-dependent class loader.

Figure 8A:
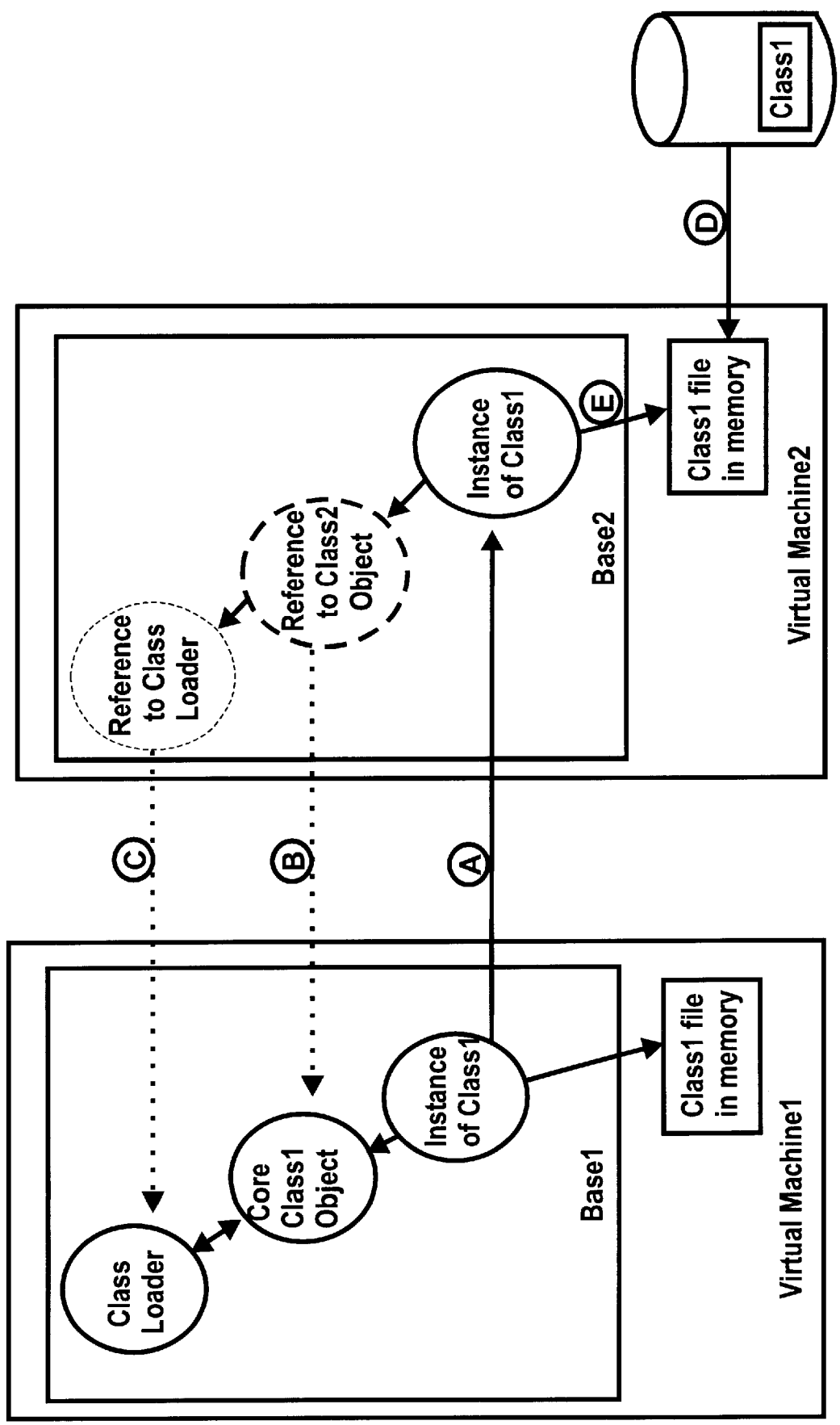
FIG. 8A is a schematic diagram showing migration of an object in core library classes in a distributed agent system according to the present invention.
Figure 8B:
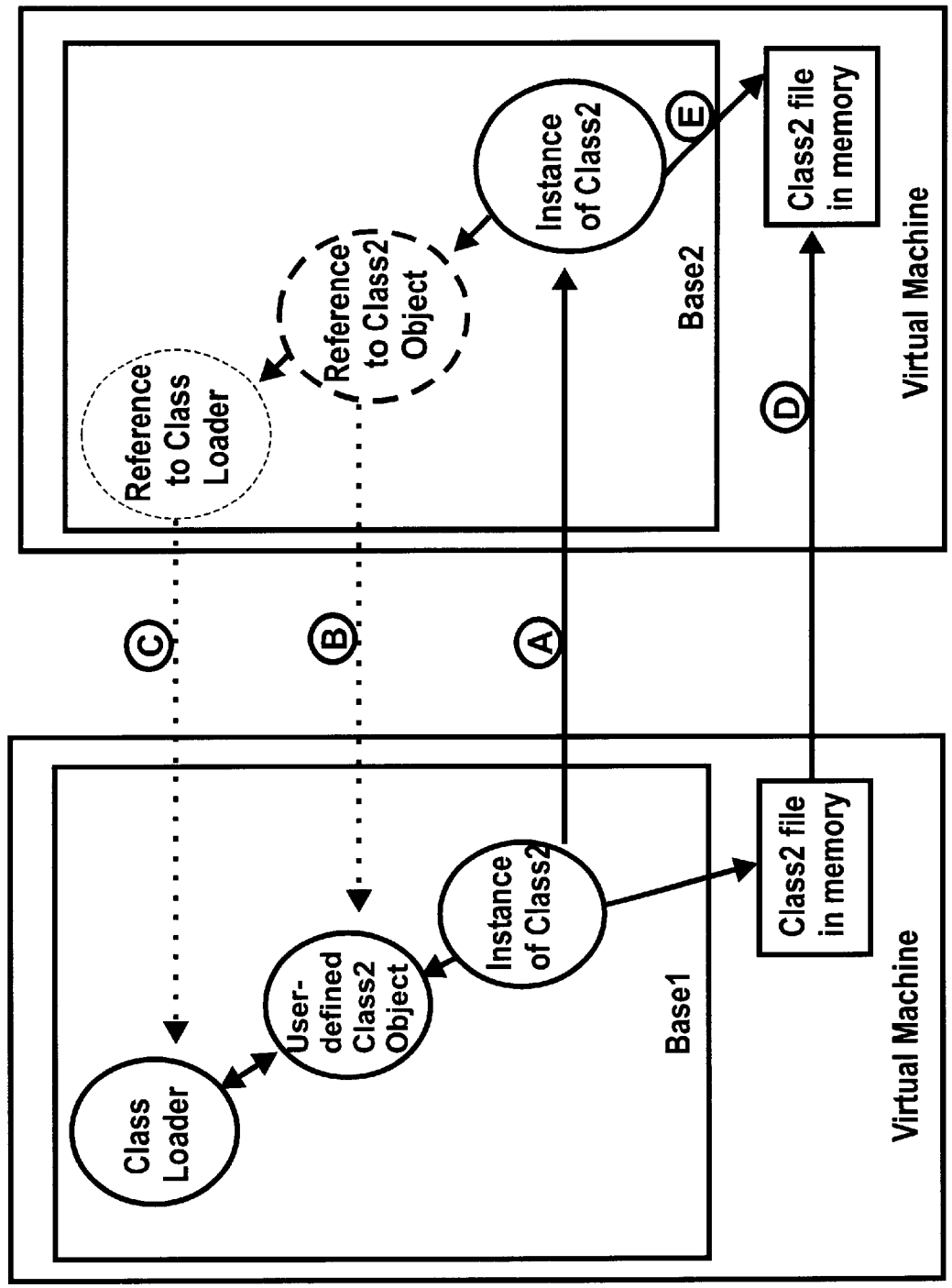
FIG. 8B is a schematic diagram showing object migration in a user-defined class in a distributed agent system according to the present invention.
Figure 8C:
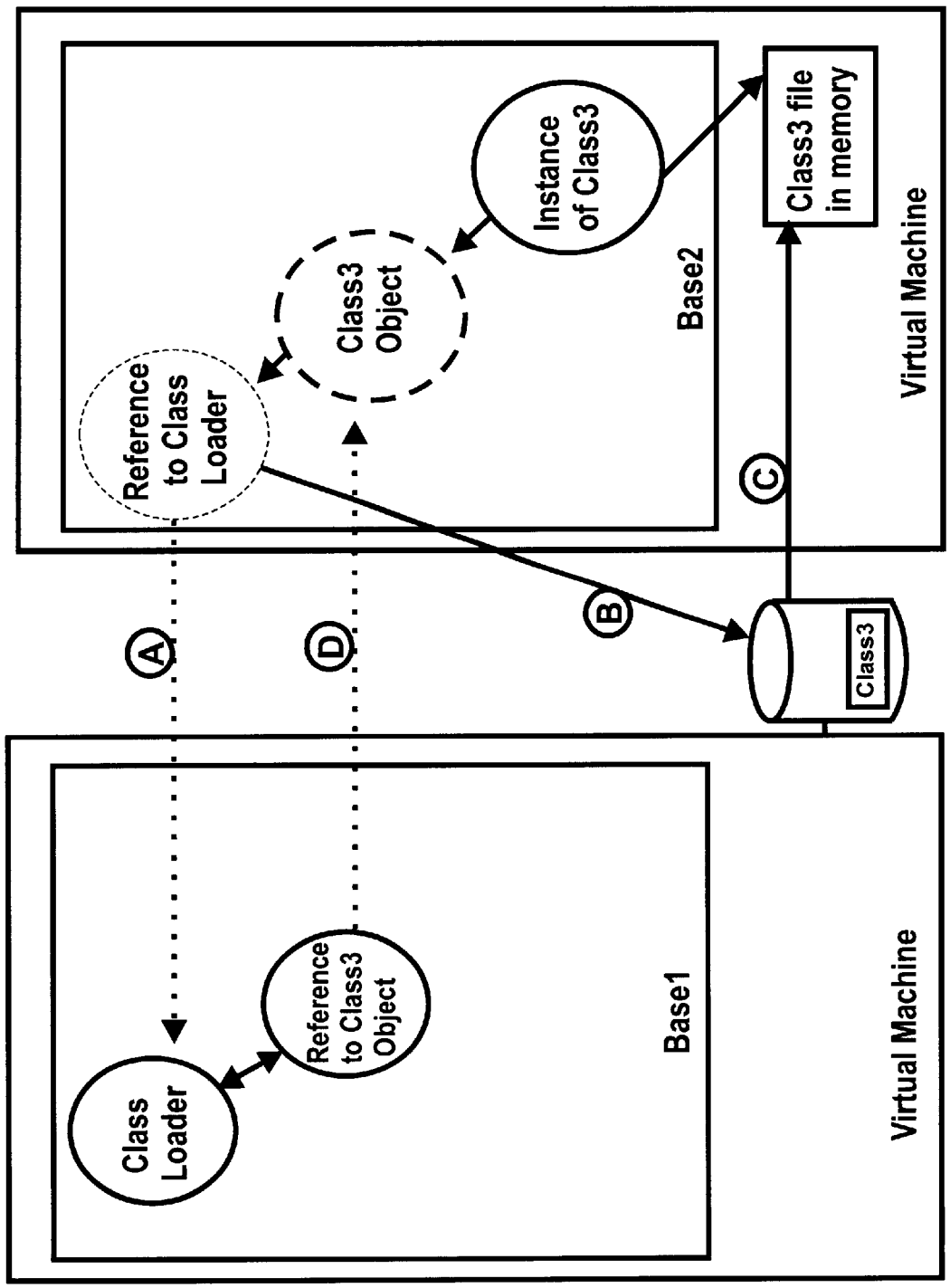
FIG. 8C is a schematic diagram showing new class object creation in a distributed agent system according to the present invention.

FIGS. 8A–8C show three cases of class loading. FIGS. 8A and 8B show two cases of object migration to a base where the corresponding class file is not loaded, while FIG. 8C illustrates new class object creation.

FIG. 8A shows migration of an object in core library classes. Core class libraries may be considered as representing system classes not modifiable by the programmer. The core class files may always be loaded from a local disk. As shown in FIG. 8A, Base1 holds a class loader and a class object (Class1) and an instance of this class. When this instance moves to Base2, the class file containing the code for this object's methods must be loaded. To do so, the following steps are performed. After the object migrates (arrow A), a remote reference to the defining class found on Base1 is created on Base2 (arrow B). Similarly, a remote reference to the class loader is also created (arrow C). Since Class1 is a core class, it can be loaded from a disk local to the machine on which Base1 is found (arrow D) and linked to the instance of Class1 (arrow E).

FIG. 8B depicts object migration in a user-defined class. In this case, the class file must be loaded from the disk in which the class file exists, or from the source base of the migration, because the source base must have the class file. FIG. 8B illustrates the latter example. Base1 holds a class loader and a class object (Class2) and an instance of this class. When the Class2 instance migrates to Base2 (arrow A), remote references to the class object (arrow B) and the class loader (arrow C) are established. The remote reference to the class loader (arrow C) allows future dynamic linking of class files created on Base1 to be transparently loaded onto Base2. The remote reference to the class object (arrow B) is required because the class object may hold global state information. The class file containing method definitions is then copied (arrow D) from Base1 to Base2. The instance object is then linked to this class file (arrow E).

Finally, FIG. 8C depicts the creation of a new class object. Here, a computation on Base2 makes a reference to a new class. Base1 holds a class loader and a class object (Class3). The class loader on Base2 is simply a remote reference (arrow A) to the class loader on Base1. The class loader loads the class file from a file system owned by Base1 (arrow B) onto Base2's local file system (arrow C). A new instance of the Class3 object is then created on Base2. A new instance of the Class3 class itself is also created on Base2. Since there must be unique reference to a given class object in the system, a remote reference to the Class3 object created on Base2 is established on Base1 (arrow D). Hence, future references to Class3 initiated on Base1 will refer to static fields and methods found in the Class3 class object resident on Base2.

Runtime System

Figure 9:
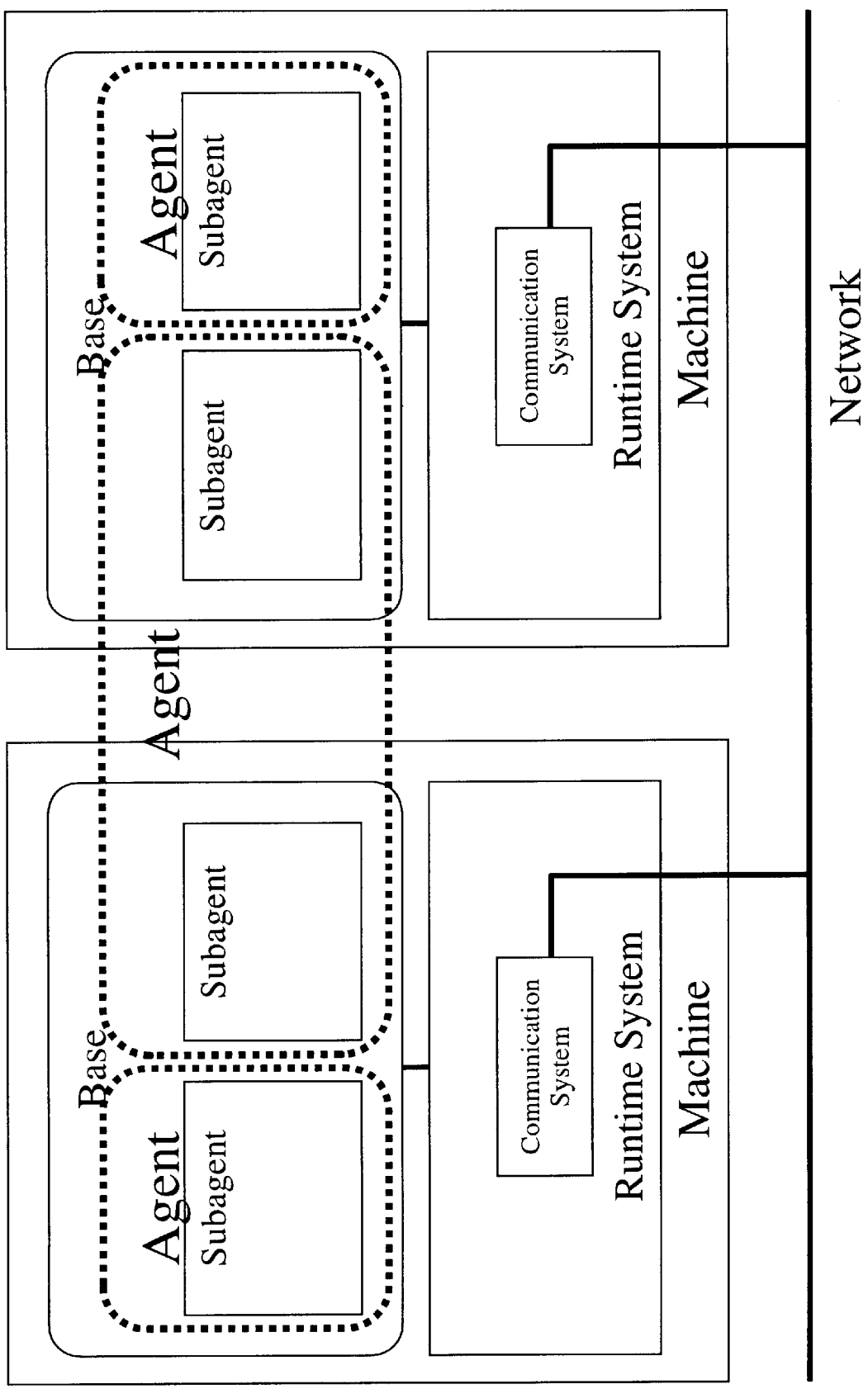
FIG. 9 schematic diagram showing the relationship of runtime systems to the other basic components of a distributed agent system according to the present invention.

The runtime system manages a data structure of a base and provides special functions described in this invention by the inventors. As FIG. 9 shows, each base is attached to a corresponding runtime system that provides certain management functions and communication support. A single communication system may be used to serve all of the runtime systems on a particular machine. An agent may comprise a plurality of subagents, each of which resides on separate bases. In this case, subagents in the separate bases are connected with the communication system supported by the runtime system or systems found on their respective bases.

Figure 10:
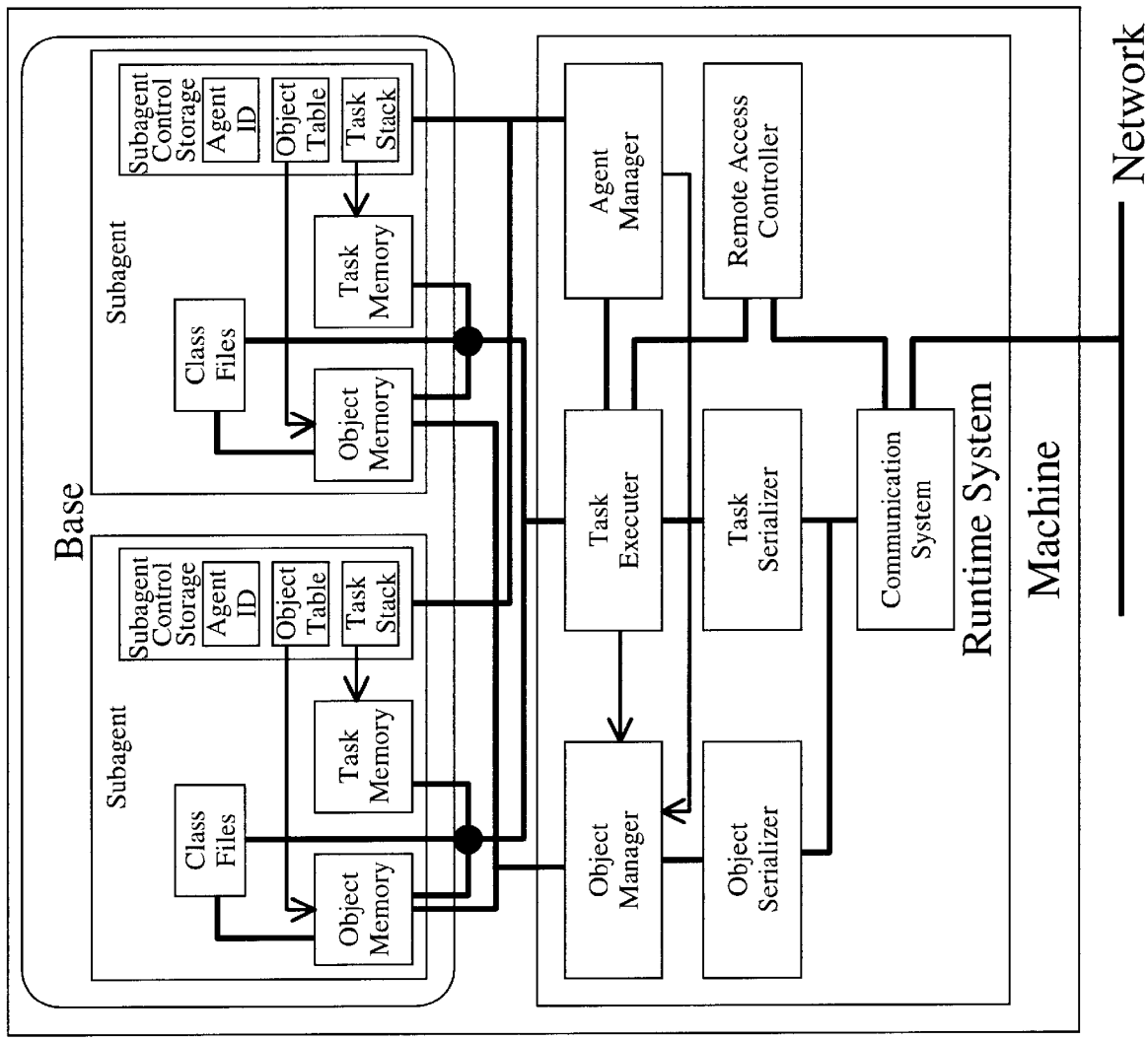
FIG. 10 schematic diagram showing subcomponents of bases, subagents and runtime systems of a distributed agent system according to the present invention.

FIG. 10 depicts subcomponents in a base and its runtime system in detail. A base includes a plurality of data blocks, including class files, object memory, task memory and subagent control storage. The object memory stores all objects in a subagent, including reference objects that refer to remote objects outside the subagent. The object memory is managed by an object manager in a runtime system and pointed to by an object table in the subagent control storage. The task memory stores thread frames, used by the task executer to manage task execution. Class files hold programming code that is accessed by the task executer. The subagent control storage stores management information for a subagent. An agent ID in the subagent control storage identifies the specific agent to which the subagent belongs (that is, the agent of which the subagent is a part). An object table in the subagent control storage points to an object memory in the subagent. A task stack in the subagent control storage points to a task memory to maintain the subagent's execution states.

An agent manager manages subagents in a base, using subagent control storage and communicating with a task executer that instantiates agents, executes programs in the class files, instantiates objects in the object memory, and manages execution task stacks in the task memory. Since both tasks and objects can migrate freely within an agent and among subagents residing on different bases, some mechanism must be available to transmit object and task state among machines of potentially different types (i.e. heterogeneous machines). Serialization is a process wherein a complex data structure (such as a tree or graph) with internal pointers is transformed into a flat object (such as an array). Pointers in the original are replaced with indices in the flattened representation and reinstantiated as pointers on the receiving agent. An implementation of a serializer is straightforward, requiring only special care to ensure that cycles in the input structure are properly recognized.

The task executer also communicates with a task serializer, to which the executer makes requests to serialize task objects, and a remote access controller, to which the executer makes requests to call remote methods. Details of one implementation of the remote access controller are described below (in the section entitled "Runtime Data Structure"). An object manager implements the object space discussed above by managing objects in the object memory, and in particular by instantiating objects, reclaiming garbage objects, and making requests for serializing objects to an object serializer. A communication system mediates interaction among bases in machines connected to the network.

While agent and object migration issues have been generally discussed above (see section entitled "Agent and Object Migration"), the participation of the runtime system in such migration is highlighted in the following additional discussion.

Figure 11A:
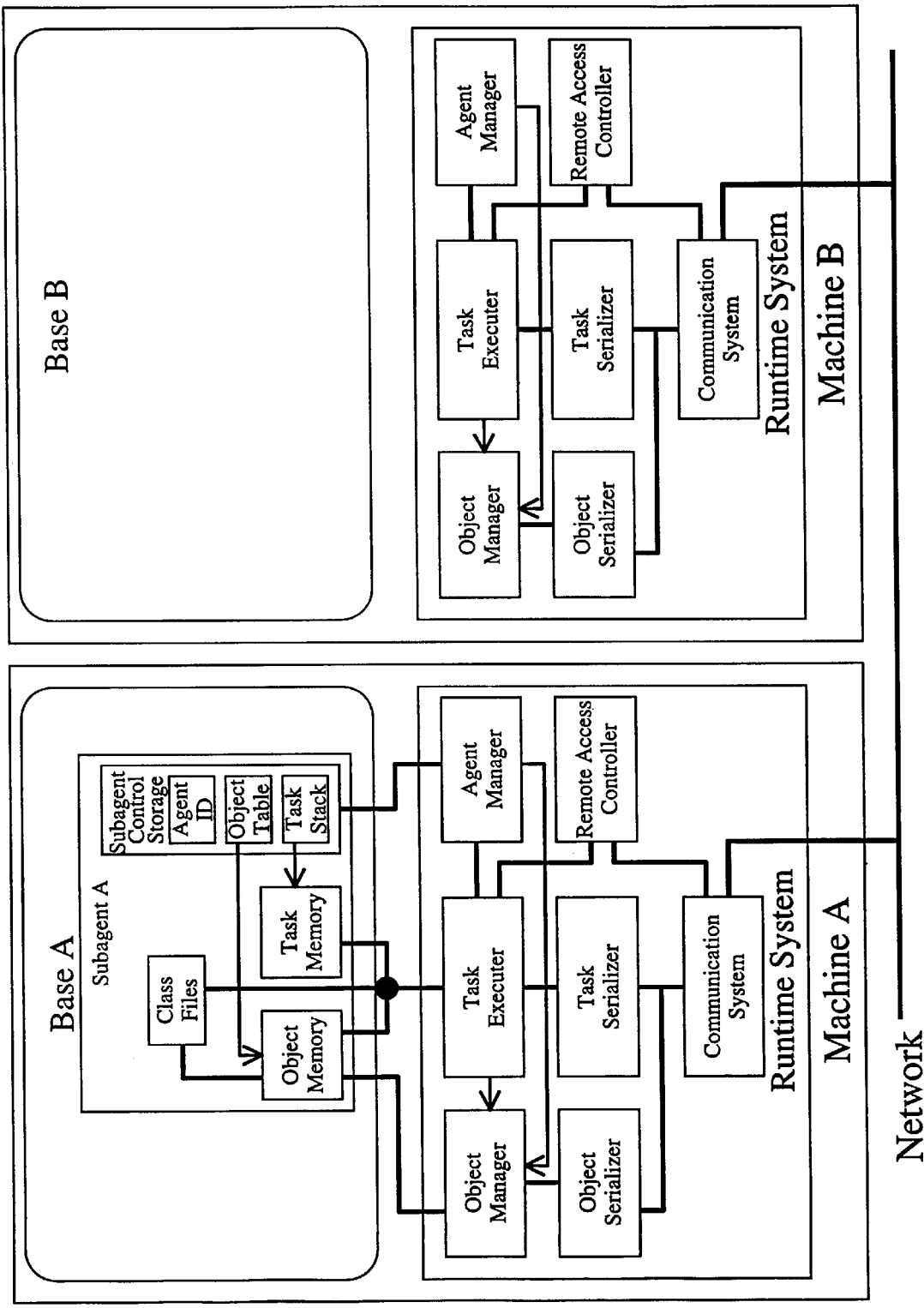
FIGS. 11A–11E are schematic diagrams showing the relationship of runtime systems of the present invention to an exemplary sequence of agent migration in a distributed agent system according to the present invention.
Figure 11B:
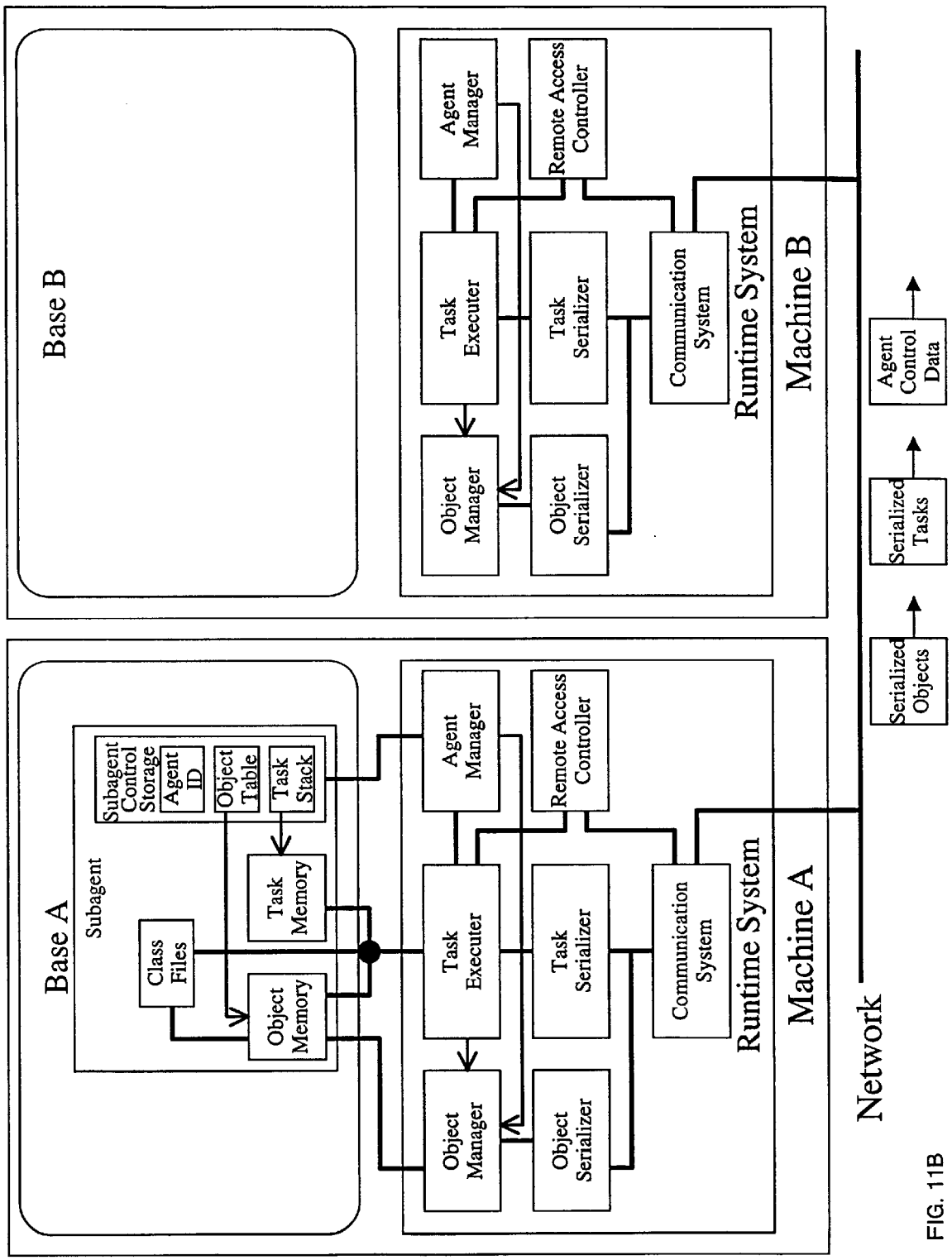

FIGS. 11A–11E show an example sequence of agent migration. As shown in FIG. 11A, an agent comprising a single Subagent A may reside on a Base A on a Machine A on the left side of the diagram. A Base A task executer is instructed to execute an agent migrate method on the agent comprising Subagent A to migrate Subagent A to Base B on Machine B. The Base A task executer requests a Base A agent manager to obtain agent control data for Subagent A and send it to a Machine A communication system. The agent control data comprises header information about the migrating agent, along with its tasks and objects. Next, the Base A task executer requests a Base A task serializer to serialize task objects within Subagent A in task memory, and the Base A task serializer sends the serialized tasks to the Machine A communication system. Similarly, objects are also serialized and sent to the Machine A communication system by the Base A object manager and object serializer. As shown in FIG. 11B. the Machine A communication system then sends the serialized objects, serialized tasks and agent control data for Subagent A over the network to the communication system for Machine B.

Figure 11C:
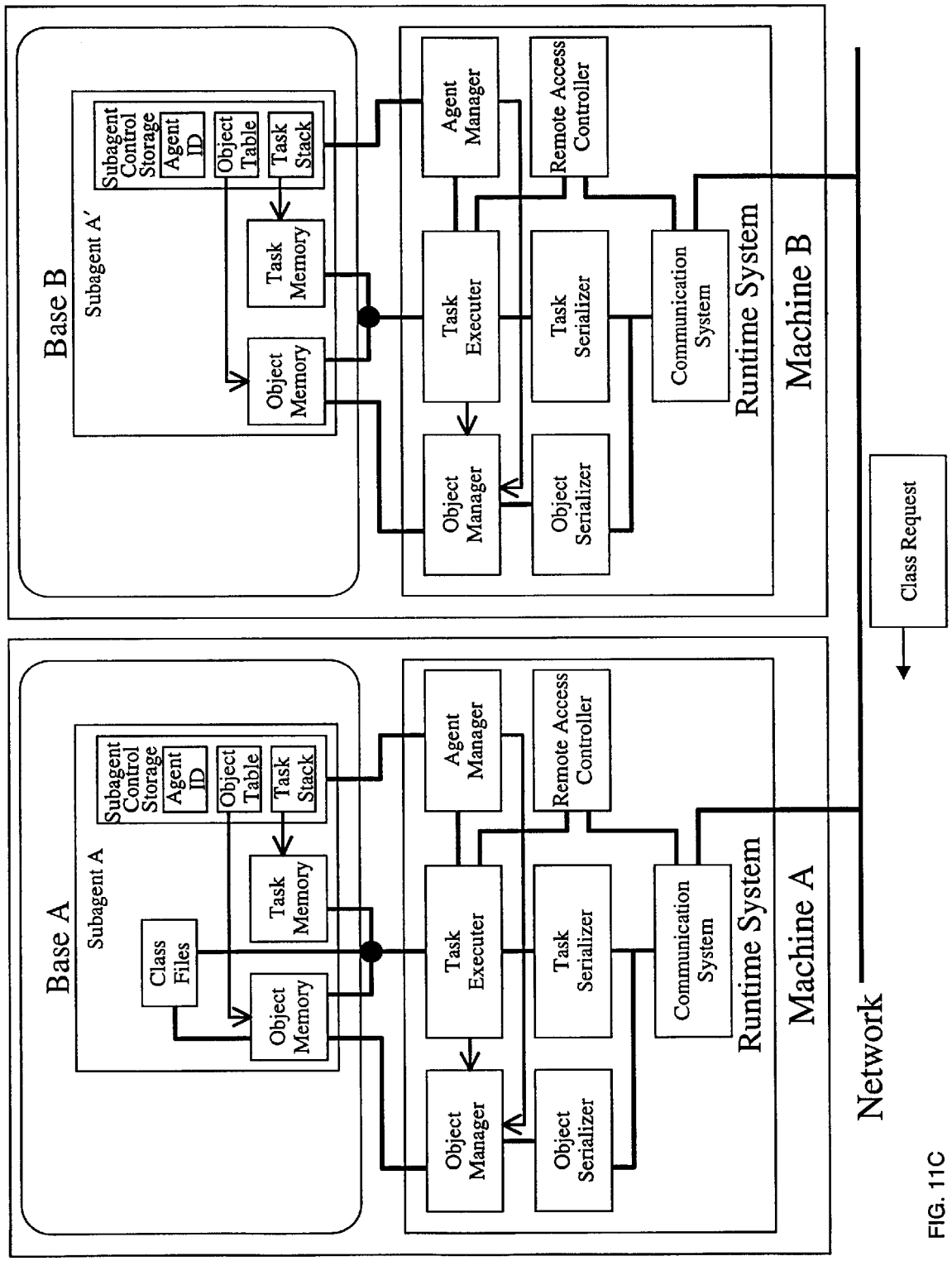
Figure 11D:
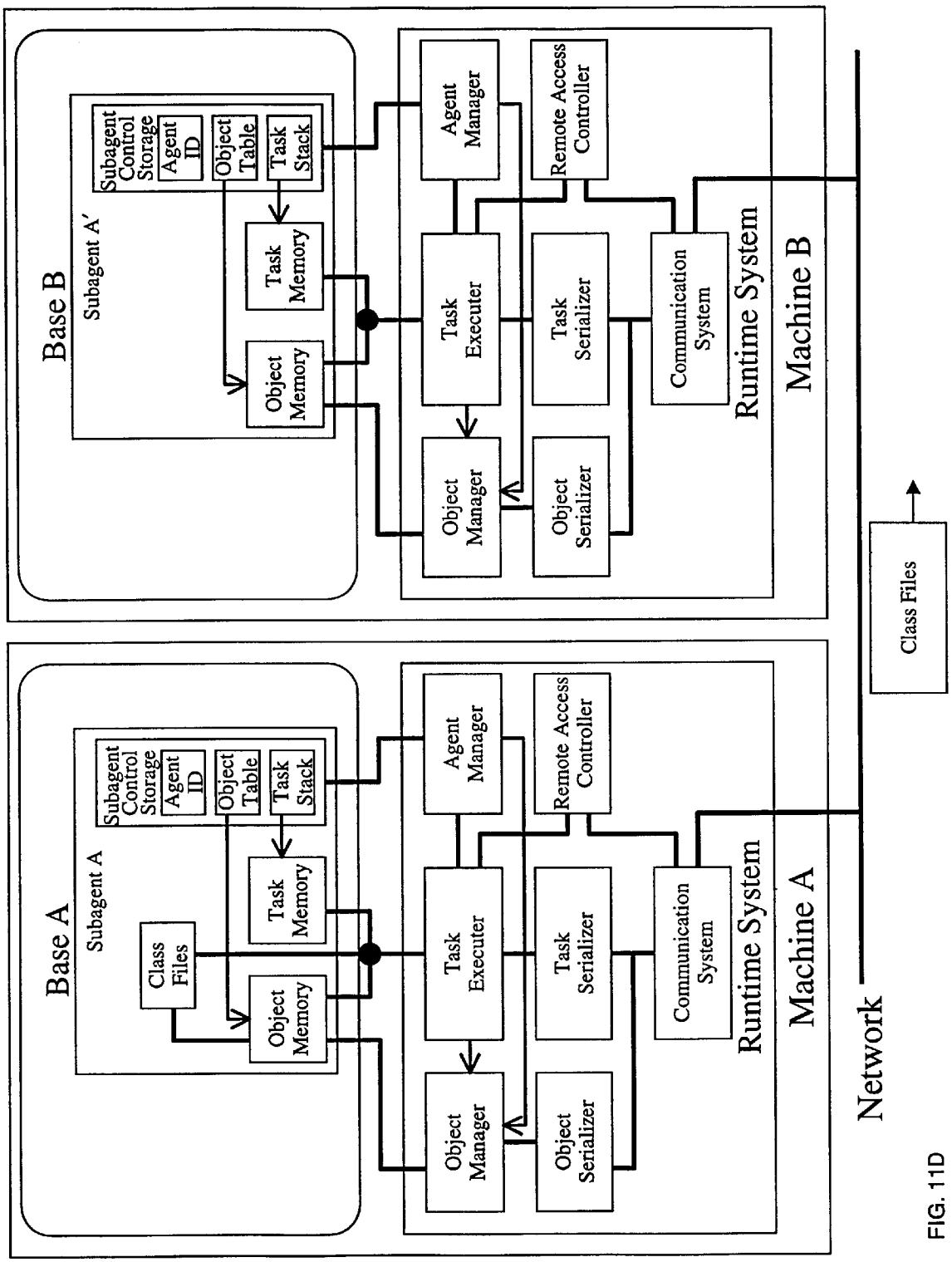
Figure 11E:
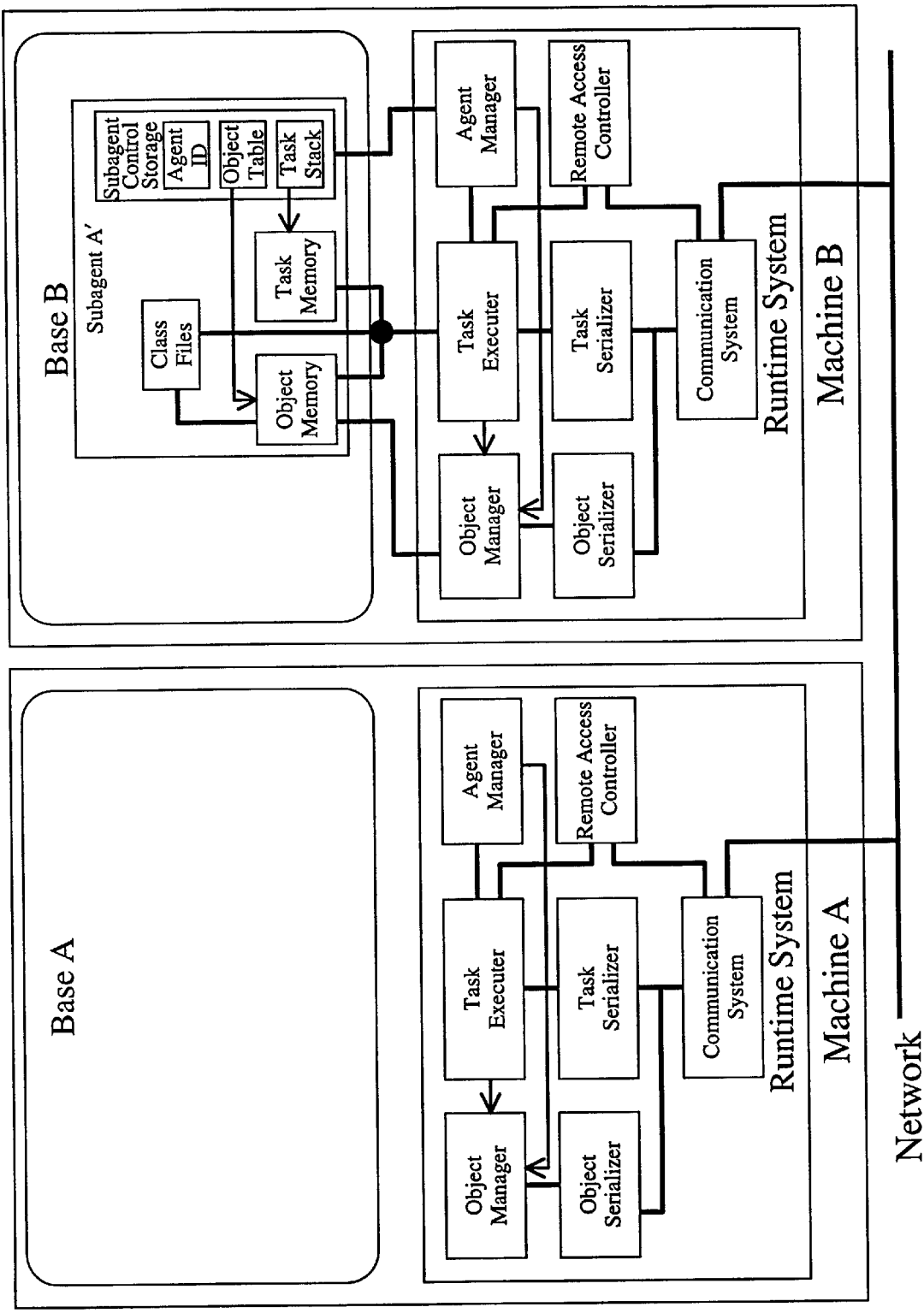

After the Machine B communication system receives the agent migration data for Subagent A (including the agent control data, serialized tasks and serialized objects), a Base B agent manager allocates a memory block for Subagent A on Base B (denoted Subagent A'), and creates a subagent control storage on Base B for Subagent A'. Machine B task executer and object manager also create task objects and data objects in Base B task memory and object memory, respectively. After Subagent A' is thus instantiated on Base B, a class request is sent from Base B to Base A over the network as shown in FIG. 11C. As shown in FIG. 11D, Base A responds to the class request by sending over the network to Base B class files for the agent which are necessary for resuming the agent on Base B. After all migration steps are finished, the memory block for the Subagent A on Base A is released, and the agent resumes as Subagent A' on the Base B as shown in FIG. 11E. In this example, Machine A and Machine B may be heterogeneous. Machine dependencies in the structure of tasks and objects are resolved by the runtime system, and in particular by the task and object serializers.

Figure 12A:
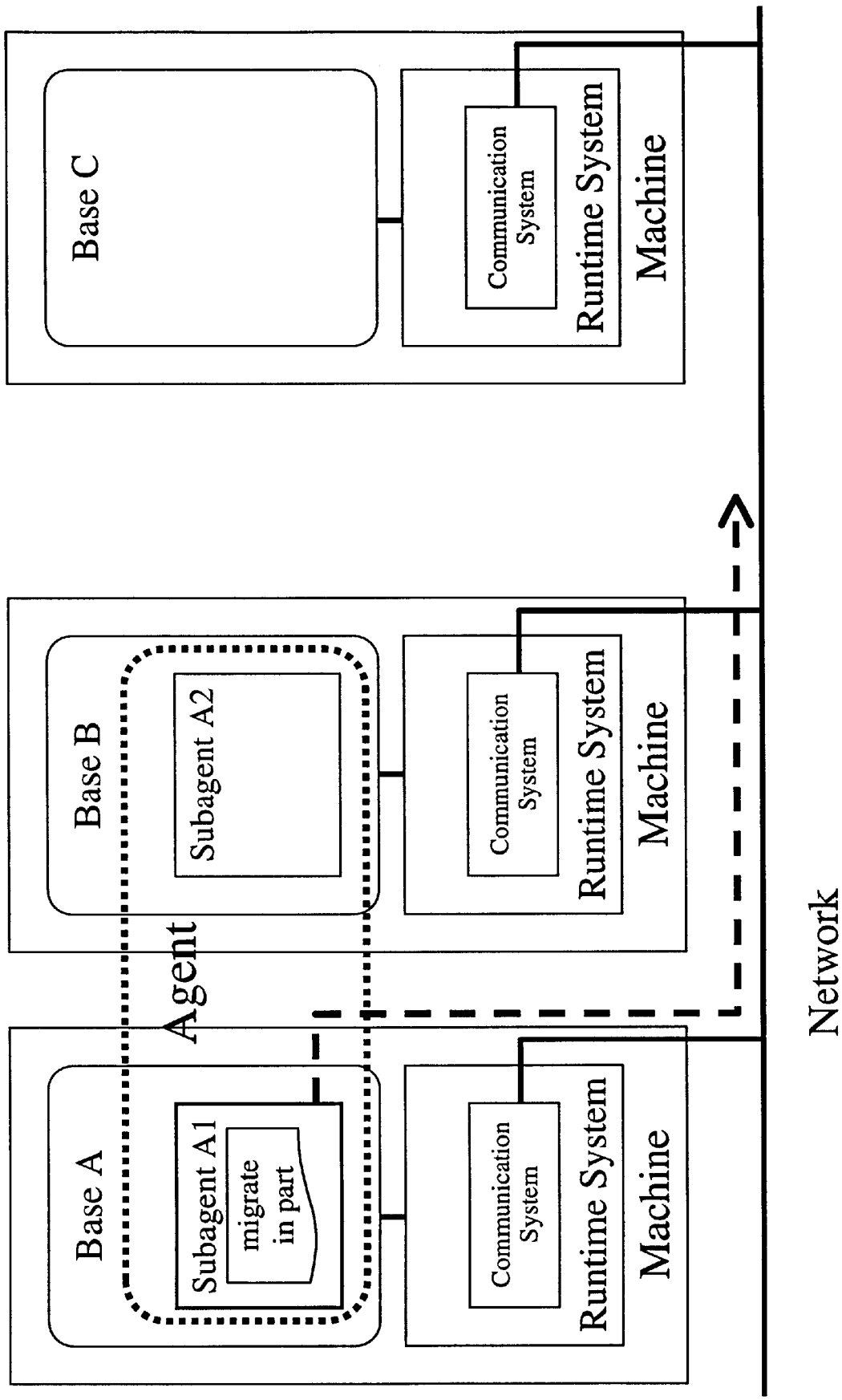
FIGS. 12A and 12B are schematic diagrams showing the relationship of runtime systems of the present invention to an example of partial agent migration in a distributed agent system according to the present invention.
Figure 12B:
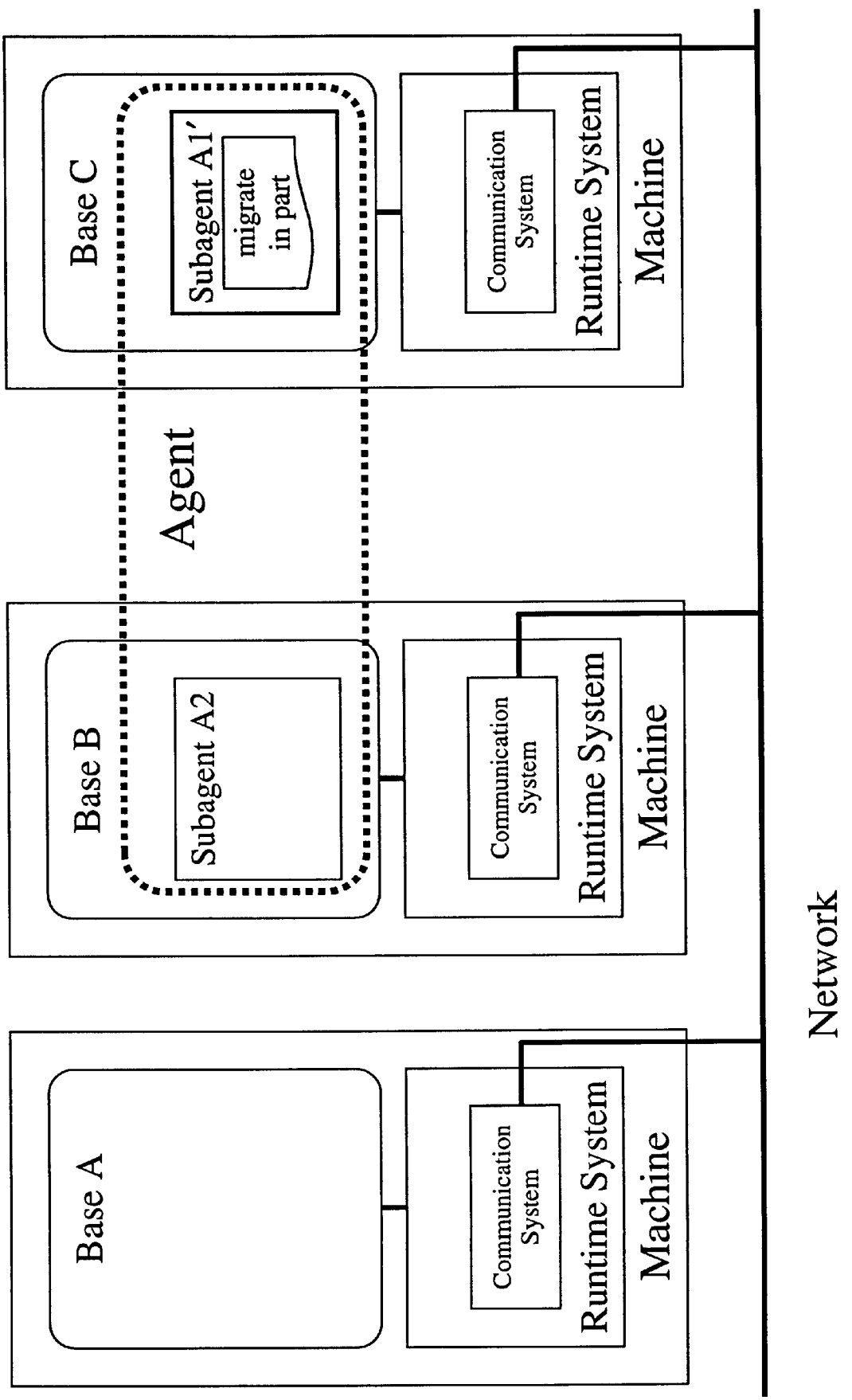

FIGS. 12A and 12B depict an example of partial agent migration, in which a part of an agent residing on a base is sent to another base, and in which remaining parts of the agent continue to reside on their current bases. In this example, as shown in FIG. 12A, an Agent comprises two subagents, Subagent A1 and Subagent A2, which reside on two bases, Base A and Base B, respectively. Partial migration of the Agent is requested, by which only Subagent A1 is requested to migrate from Base A to a Base C, while Subagent A2 remains on Base B. A serialization process for Subagent A1 is performed in a manner similar to that shown in FIGS. 11A–11E and described above. After the partial migration as shown in FIG. 12B, Subagent A1 has migrated from Base A to Base C as Subagent A1', and the entire agent therefore resides on both Base B and Base C.

Figure 13A:
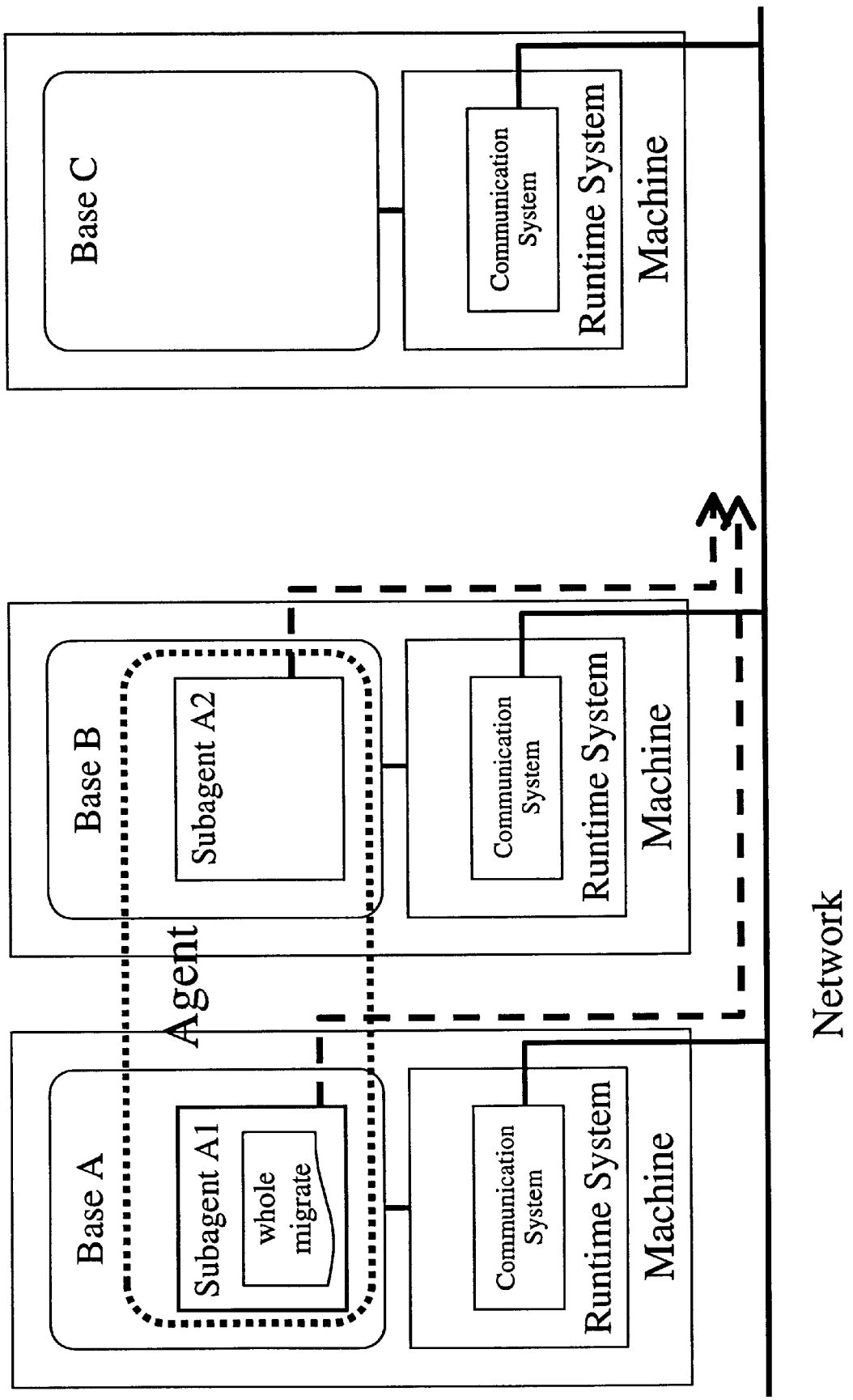
FIGS. 13A and 13B are schematic diagrams showing the relationship of runtime systems of the present invention to an example of whole agent migration in a distributed agent system according to the present invention.
Figure 13B:
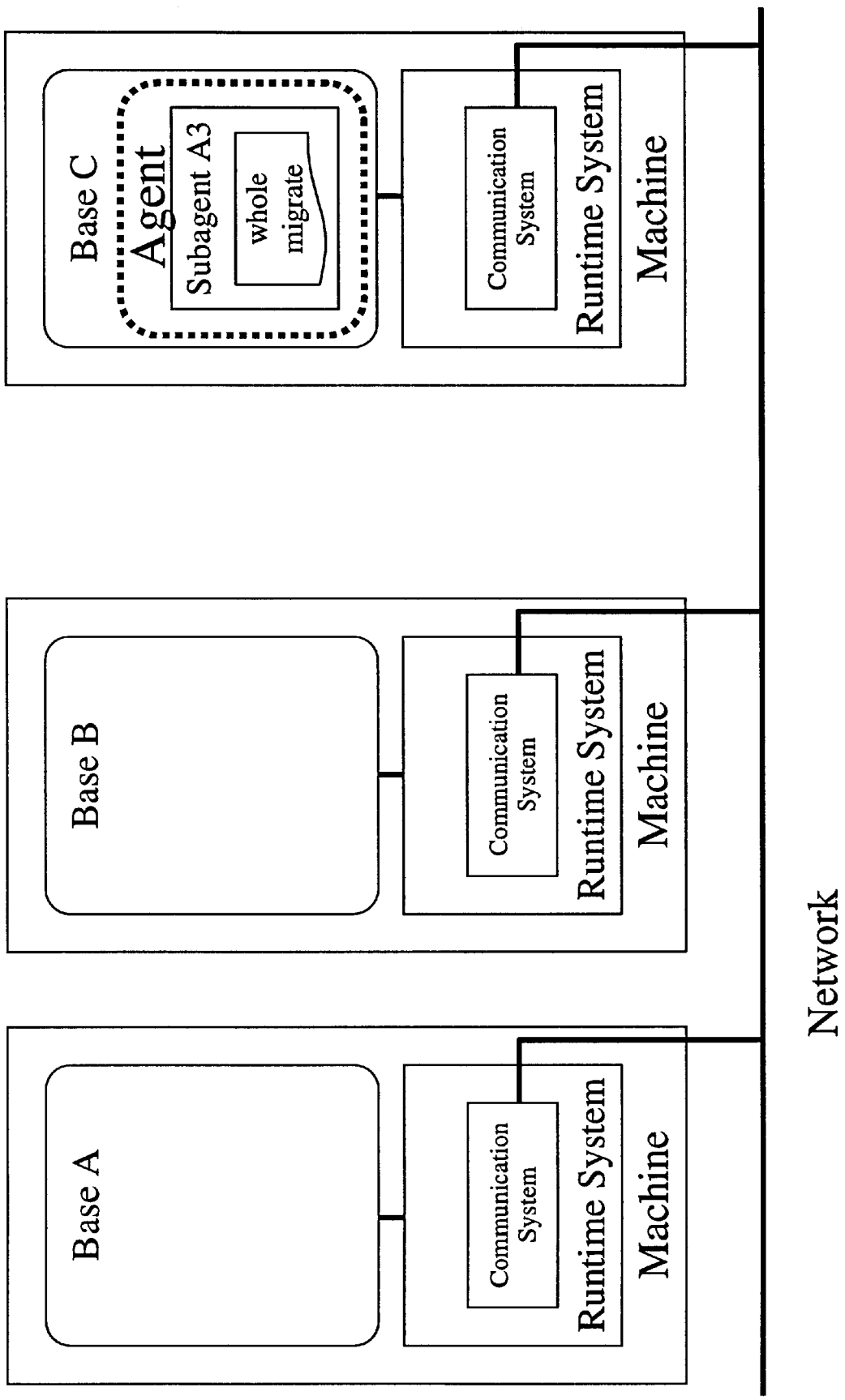

FIGS. 13A and 13B depict an example of whole agent migration, in which all parts of an agent migrate to a target base. In this example, as shown in FIG. 13A, an Agent comprises two subagents, Subagent A1 and Subagent A2, which reside on two bases, Base A and Base B, respectively. Subagent A1 residing on Base A executes a whole agent migrate method, requesting migration of the entire Agent to which Subagent A belongs to a Base C. Another portion of the Agent, namely Subagent A2, happens to reside on another base, namely Base B. As a result of whole agent migration, both Subagent A and Subagent B migrate to Base C and are merged into a single subagent, Subagent A3, as shown in FIG. 13B.

Figure 14A:
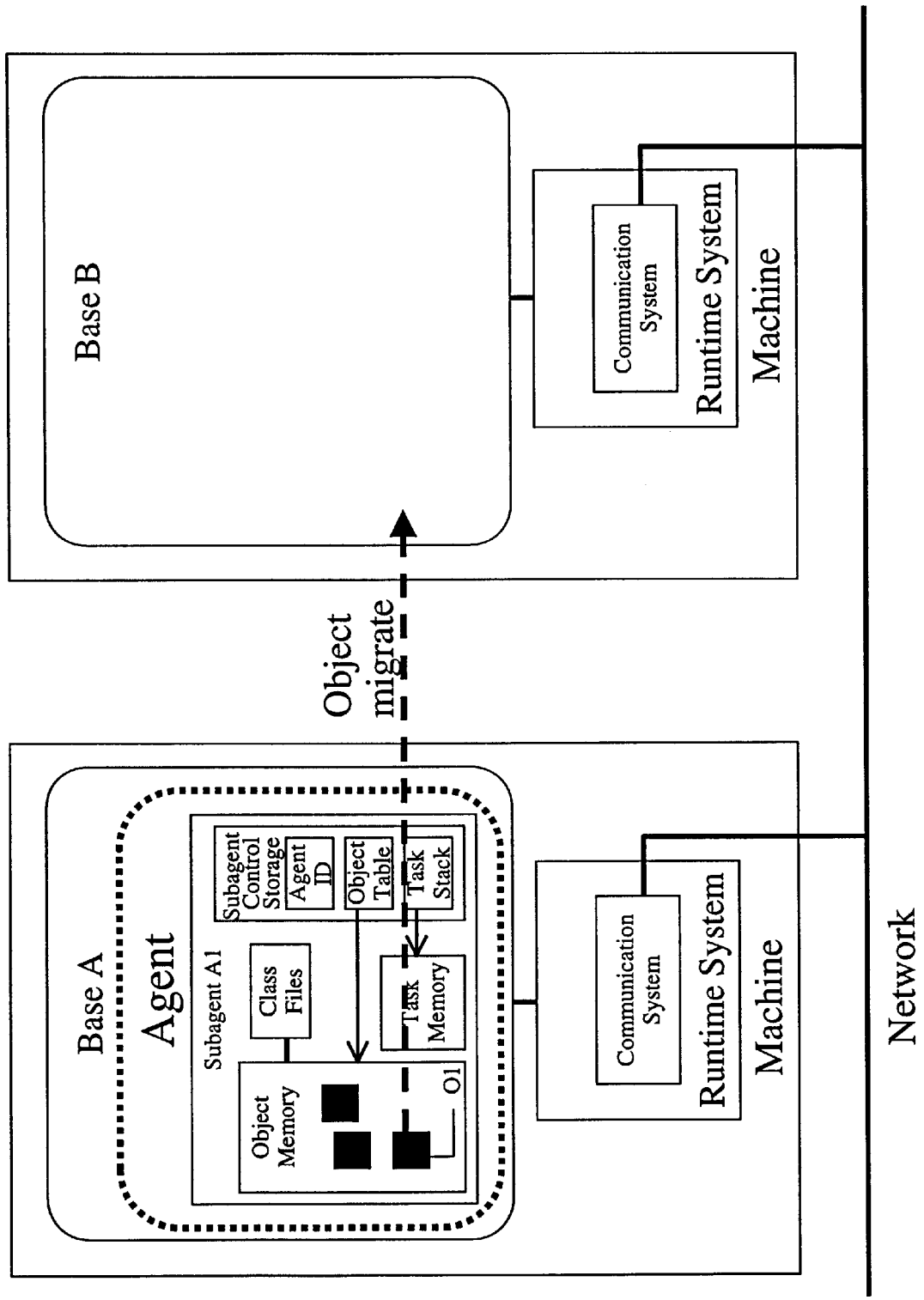
FIGS. 14A and 14B are schematic diagrams showing the relationship of runtime systems of the present invention to an example of object migration in a distributed agent system according to the present invention.
Figure 14B:
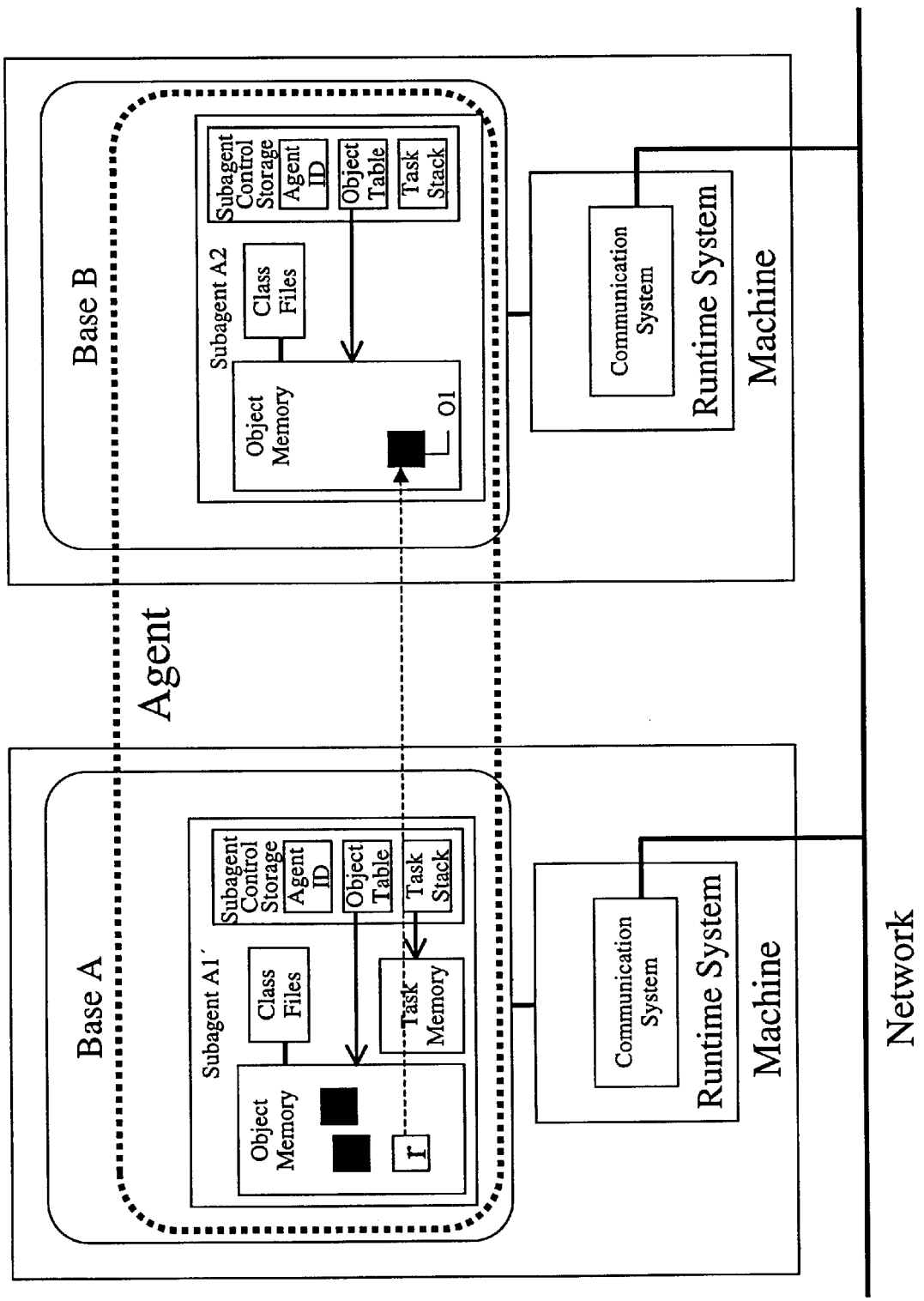

FIGS. 14A and 14B show an example of object migration. An Agent comprising a single subagent, Subagent A1 resides on a Base A as shown in FIG. 14A. Subagent A1 includes an object memory containing an object, Object O1. A programmer requests that Object O1 migrate from Base A to Base B. Object O1 is serialized and sent to Base B using the Base A runtime system and communication system. The Base B communication system receives the serialized Object O1, and if there is no subagent associated with the Agent on Base B, then the Base B runtime system creates a new memory block for a new subagent, Subagent A2, as shown in FIG. 14B. In this example, the Agent resides on both Base A and Base B after the migration of Object O1, and a forwarding object "r" is created in Subagent A1' to Object O1 on Base B to maintain network-transparent references to Object O1 even after the object migration.

Figure 15A:
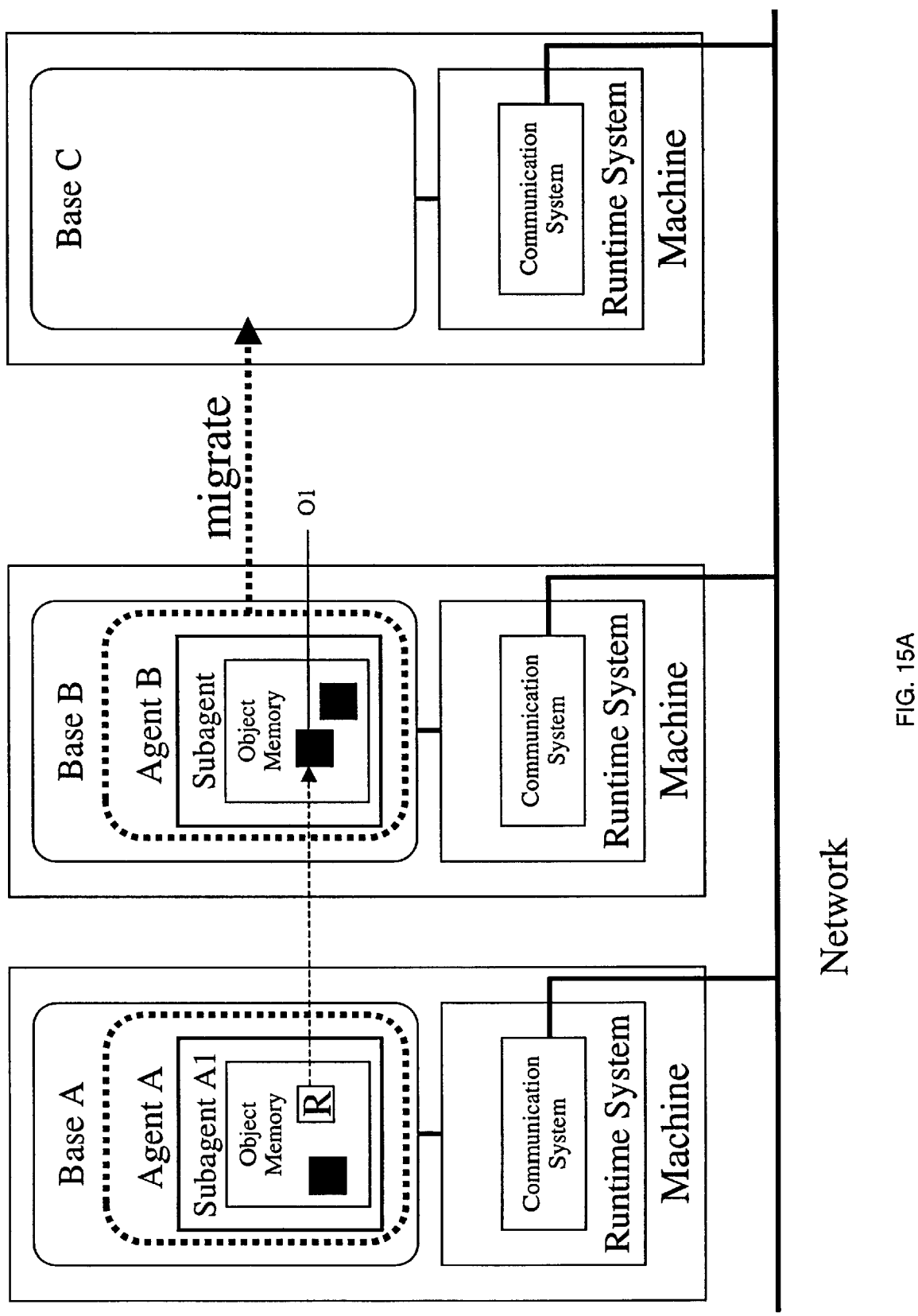
FIGS. 15A and 15B are schematic diagrams showing a first example of remote object access in the context of agent migration in a distributed agent system according to the present invention.
Figure 15B:
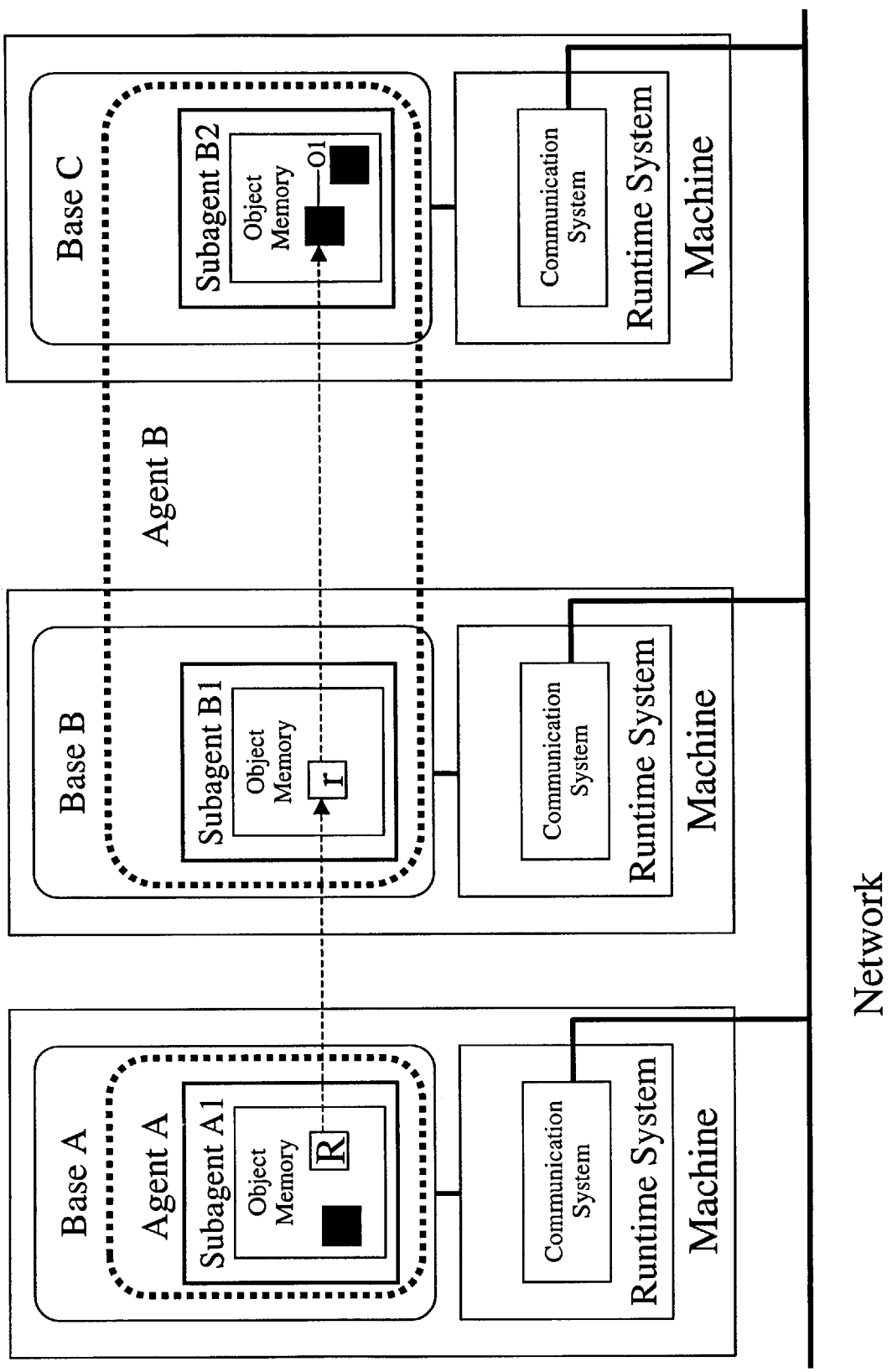

FIGS. 15A and 15B depict one example of remote object access in the context of agent migration. In this example, as shown in FIG. 15A, a first agent, Agent A, resides on Base A and includes a Subagent A1 having a reference object R which refers to an Object O1, which is found within a second agent, Agent B, residing on Base B. Agent B migrates to a third base, Base C, after which Agent B comprises a Subagent B1 on Base B and a Subagent B2 on Base C as shown in FIG. 15B. A forwarding object "r" is created in Subagent BI on Base B, so that Base A can access the Object O1 even after the Agent B migrates to Base C, as also shown in FIG. 15B.

Figure 16A:
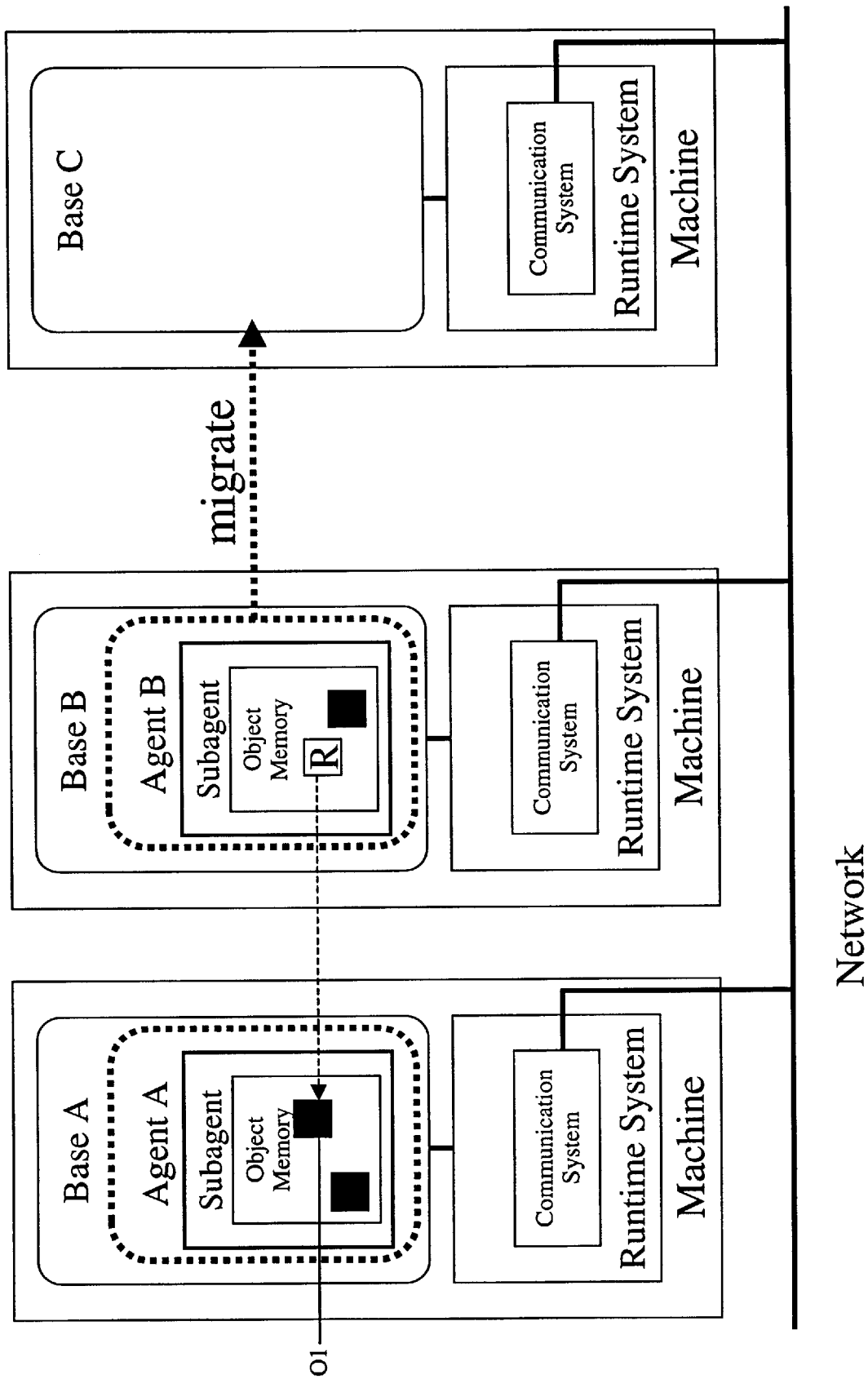
FIGS. 16A and 16B are schematic diagrams showing a second example of remote object access in the context of agent migration in a distributed agent system according to the present invention.
Figure 16B:
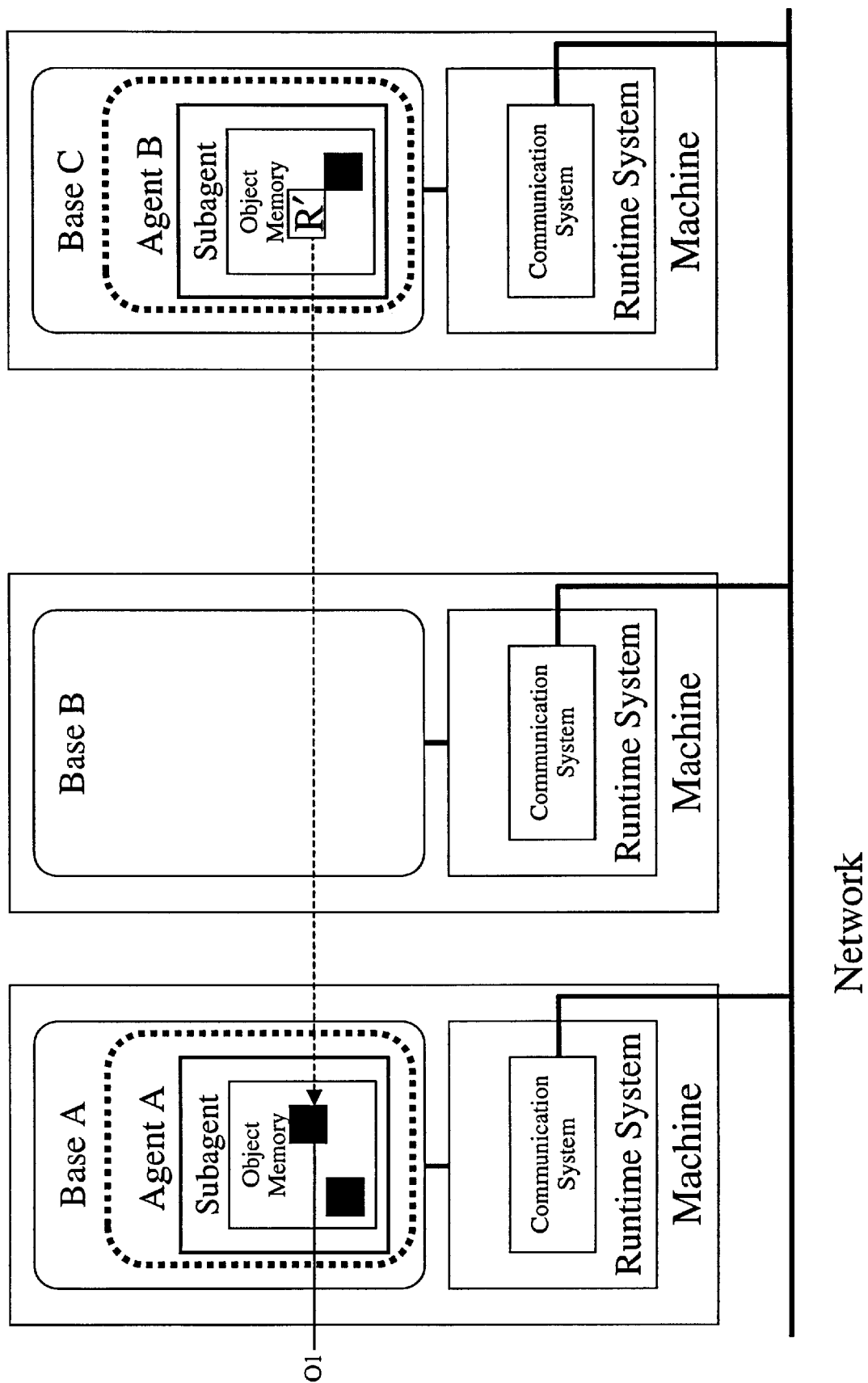

FIGS. 16A and 16B depict another example of remote object access in the context of agent migration. In this example, as shown in FIG. 16A, a first agent, Agent A, resides on Base A and includes a subagent having an Object O1. A second agent, Agent B, resides on Base B and includes a subagent having a reference object R referring to the Object O1 on Base A. Agent B migrates to a third base, Base C, after which Agent B comprises a single subagent which now resides on Base C as shown in FIG. 16B. A new reference object R' is created within Agent B on Base C for maintaining consistent access to the Object O1 residing on Base A.

Runtime Data Structure

Instances in the present invention are preferably allocated from a heap. To keep preferable 64-bit values aligned properly, all objects are preferably maintained with 64-bit alignment. On byte-addressable machines this allows up to three low-order bits to be used as tags. For regularity, run-time data structures are implemented as instances of the invention whenever possible.

Both the garbage collector and the code that marshals messages need to distinguish pointers from data and to determine the sizes of objects in memory. The marshalling code also needs additional information. For example, it must be able to distinguish between interned and uninterned strings. Floating point numbers may need to be converted when moving data between dissimilar machines, so the marshalling code must be able to locate them as well.

(a) Instance

Besides its own fields, each instance preferably includes its class, an integer "hashCode" and a mutex. If the instance has ever been exported from the base on which it was created it also contains a global id. Most Java implementations derive an instance's hash value from the location of the object in memory. Because the present invention moves objects between bases, changing their location in memory as it does so, the hash value needs to be stored within the instance itself. The hashCode, mutex, and global id are created as needed; a newly created instance has none of them. As shown in the "Instance" block 200 of FIG. 17, the layout of an instance is preferably as follows:

The instance's class
(Integer hashCode)
(Mutex)
(Global id)
The instance's fields Most objects are not hashed, locked, imported or exported. Therefore, to reduce the size of these common objects these fields could be merged, at the cost of a slight increase in the cost of accessing them.

All information common to the instances of a particular class, including the data layout information needed by the garbage collector and marshalling code, is stored in the class.

(b) Arrays

For regularity, arrays are preferably represented as instances of a special array class. Each instance has fields containing the array's type, size, and elements. Array instances need to be handled specially by the garbage collector because, unlike other instances, the size of an array is not determined by the array's class.

(c) Class

Figure 17:
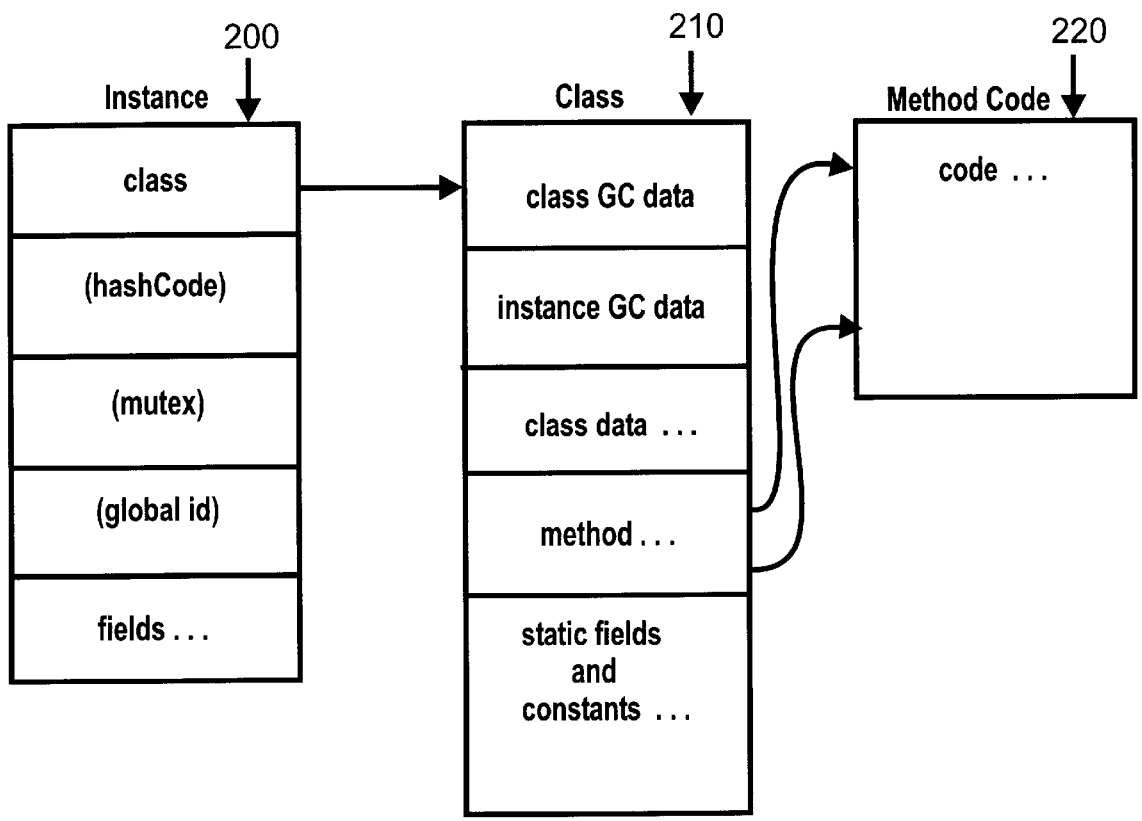
FIG. 17 illustrates an instance object and a class object for use in a distributed agent system according to the present invention.

As shown in FIG. 17, a class object 210 may be organized into five areas:
(1) Class-specific information for the garbage collector (GC);
(2) Instance-specific information for the garbage collector (GC);
(3) Data common to all classes;
(4) Instance and static method table; and
(5) Constants and static fields.

The following data is found in every class:
Data layout information for this class;
Data layout information for instances of this class, including whether this is an array class;
This class's superclass;
The instance of class "Class" for this class;
The class loader used to load this class;
Initialization status; and
Interface method table index.

The method tables are sequences of pointers to code, one for each instance and static method in the class. An instance is invoked by jumping to the code found at the appropriate offset. Because instance method code offsets must be the same for a class and any subclasses, the instance method table begins at the same offset in every class.

The name of the class and the interfaces it implements are found in the Class instance. To speed up casts and run-time type checking, each class could also contain a succinct representation of its location in the class hierarchy.

Although not shown in FIG. 17, the code for a class's methods can contain pointers back to the class. Preferably class objects and their code are not in the heap. They are instead part of the class file, and are created when the class file is loaded.

(d) Thread

Threads express execution states of programs in runtime and may be instances of a thread class. In addition to the standard fields for that class, each thread contains a stack. This stack is a linked list of stack segments, each of which contain a sequence of stack frames. An implementation of a frame contains a pointer to size and type information for local variables and arguments. This information is used to properly handle routine type checking, and is also used by the garbage collector. It is possible to evaluate this information dynamically if garbage collection occurs infrequently.

(e) Subagents

A subagent is the portion of an agent that resides on a particular base. Instances within a subagent are "local" to that subagent; all other instances are "remote." Subagents are represented as instances of a subagent class. Their fields and methods are all related to the communication protocol and are detailed in that section.

(f) Remote References

References to instances that exist in other subagents have much the same representation as local instances. The class pointer does not point to the regular class, but instead to a copy of the class whose method pointers point to RPC stubs for the methods. Calling a method for a remote instance is identical to calling a method in a local instance. This avoids the need for testing the location of an object when doing a method dispatch. Such a test is required when doing a field reference for an instances other than self. Remote references have no fields; they have a non-null global id.

(g) Global Id

A global identifier or "global id" records the identity and current location of an instance that has been seen by more than one base. The global identity of the instance is determined by the base on which it was created along with an integer identifier assigned by that base.

Global identifiers are the mechanism by which object spaces are implemented. Every object within an agent has a global id. The contents of this identifier are sufficient to locate the object regardless of where it resides in the system.

A global id preferably contains the following data:

An integer identifier;

The subagent to which the instance belongs;

"null" or the instance if it currently resides on the local base; and

A reference count and any other information needed by the global garbage collector.

Forwarding pointers are needed if the object migrates from its original home. References which touch a forwarding pointer are updated to reflect the object's new location.

Communication Protocol

One example of an implementation of a communication protocol suitable for the invention is discussed below. It should be noted, however, that other suitable communication protocols may be devised which are suitable for use in connection with the present invention, and that the present invention is not limited by the particular communication protocol set forth below.

This protocol was originally designed and implemented for the Kali language, as described in H. Cejtin et al., "Higher-Order Distributed Objects," ACM Transactions on Programming Languages and Systems Vol. 17, No. 5, pp. 704–739 (1995), and is described in U.S. Pat. No. 5,745,703 entitled "Transmission Of Higher-Order Objects Across A Network Of Heterogeneous Machines," issued Apr. 28, 1998. Both of these references are expressly incorporated herein. Much of the Kali implementation can be used to implement the communication protocol for the present invention.

(1) Shared Data Structures

Most instances exist on only a single subagent. On all other subagents the instance is represented by a remote reference that contains no fields or other data. There are several exceptions to this rule: classes, interned strings, and subagents.

Every subagent has a local copy of the static data of any class. The values of any nonconstant static fields of a class are located on a single subagent.

All literal strings and string-valued constant expressions have global identity. Each subagent has its own copy of every interned string that it references. Strings contain no mutable data, so no confusion arises.

The local representation of another subagent must contain the information needed to communicate with that subagent. Unlike classes and interned strings, this data is local; it is not a copy of information found on other subagents. The structure of a subagent is described in the next section.

(2) Subagent Data

Every subagent instance has a global id. All subagent instances preferably contain the following fields:

A globally-unique identifier;

decode: a vector mapping ids to instance; and pending: a vector of mapping ids to partially transmitted instances.

Fields in subagent instances that a particular subagent is communicating with:

base: the base on which the subagent resides;

wait queue: a queue of threads waiting to for a connection to be established; and in-port, out-port: ports for talking with the subagent.

(3) Communicating Instances

An instance is preferably transmitted as three ids: that of the class of the instance, that of the subagent that created the instance, and that of the instance itself. If the instance was created by the local subagent and has not been transmitted before, a global id must be created for it and the instance added to the local subagent's decode vector.

Note that all ids of subagent instances are those of the local instance representing the subagent. A particular subagent may be assigned different ids by every other subagent on which it is known. Preferably, by convention the id of the local subagent itself is zero.

The receiving subagent uses the three ids as follows: the subagent id is looked up in the decode vector for the transmitting agent, and the instance id is looked up in that subagent's decode vector. The class id is used only if the second lookup fails.

For example, consider three subagents A, B, and C, and that A has assigned id "3" to B. Further, B has an instance I, to which it assigned id "2", that it has sent to A. When subagent A sends a reference to I to subagent C, it sends the ids "3" (for the subagent) and "2" (for the instance). Subagent C then uses its decode vector for subagent A to translate "2" into its subagent instance for B, and then uses the decode vector in that instance to translate the "3" into the local reference.

There are three problems that can arise with the receiver: it may not have a local entry for the subagent id; it may not have a local entry for the class; and it may not have a local entry for the instance id. If it is missing the subagent id or the class id it can send a request back to the transmitter asking for the missing subagent's global identifier or the absolute name of the class. Once the global identifier is received, either the receiver already has an instance for the subagent (it merely did not have the transmitter's id for it), or this is the first time the receiver has heard of this subagent and a new subagent instance is created.

If the receiver has no local entry for the instance, its next step depends on the class of the instance. If it is a subagent the receiver requests the global identifier as above. If it is an interned string, then the receiver asks the sender for the characters in the string, and either uses or creates a local copy. In all other cases the receiver can create a remote reference to the instance without any further communication.

(4) Delayed Messages and Pending Instances

As explained above, a message may be received which contains references to an unknown subagent or interned string. Such messages are preferably delayed until the relevant information arrives from the sender. Other messages that refer to the same unknown instance may arrive after a request for information has been sent and before the reply is received. These messages must also be delayed.

Information about received-but-unknown subagents and interned strings are stored in the "pending" vector in subagent instances. If a uid is not found in the decode vector it is looked up in the pending vector. If found there, a request for the instance's data has already been sent, but the current message must be delayed until the information arrives.

(i) Garbage Collection

Since objects within an agent are distributed among a collection of machines, a global, asynchronous garbage collection strategy is preferable. A scheme of distributed reference counts is preferably used to allow the identification of instances whose remote references have been garbage collected. Each global id contains a non-zero reference count. Sending an instance to another subagent requires sending one or more reference counts along with the three ids described above. These reference counts are added to those in the global id on the receiving subagent.

If an instance in a message has a global id whose reference count is one, the sending subagent must delay sending the message. It cannot send the instance without a reference count and it must keep the one that it has. Additional reference counts are requested from the subagent that currently contains the instance. Once they arrive, the message can be sent along with some of the newly arrived reference counts. When a global id is no longer referenced by a subagent, its reference counts are sent back to the subagent containing the instance. Once that subagent has received all extant counts for the instance, the instance can be reclaimed by the agent's local garbage collector.

Exemplary Uses For The Invention

As will be readily understood by one or ordinary skill in the art, the distributed agent system of the present invention clearly has wide applicability in the field of distributed computing, and can be implemented on a wide spectrum of network communication systems from low-bandwidth, high latency communication over modems to high-bandwidth, low-latency communications such as found in clusters of high performance computers. As particular examples of such utility, the present invention offers effective support for network-centric application in which mobility is important. Such applications may include mobile software assistants capable of automatically retrieving and updating data on a corporate intranet, and adaptable query engines that execute queries and migrate database state among machines in a network to optimize availability and bandwidth. In addition, distributed applications which require high performance, such as data mining, warehousing, and search applications, will also benefit from use of the present invention. The foregoing examples are to be understood as being merely exemplary and merely serve to illustrate but a few of the many and varied possible uses for the present invention.

While there has been described and illustrated herein a distributed agent system which provides an object-based encapsulation model (an agent) which allows the processes and state of the agent to be distributed over multiple potentially heterogeneous machines, enables transparent access of data resident on another machine, and allows easy and efficient process migration, in whole or in part, among distinct machines, it will be apparent to those skilled in the art that further variations and modifications are possible without deviating from the broad teachings and spirit of the invention which shall be limited solely by the scope of the claims appended hereto.

What is claimed is:

1. A distributed software system for use with a plurality of computer machines connected as a network, the system comprising:

a plurality of bases, each base providing a local address space and computer resources on one of the plurality of computer machines;

at least one agent comprising a protection domain and a global object space, wherein the protection domain of the at least one agent resides on at least one of the plurality of bases;

a plurality of objects contained within the protection domain of the at least one agent, a first object residing on a first base of the plurality of bases and a second object residing on a second base of the plurality of bases, wherein the global object space includes a mapping of symbolic references of objects within the at least one agent to corresponding physical addresses of said objects, whereby the first object on the first base may access the second object on the second base without knowledge of the physical address of the second object on the second base by obtaining a symbolic reference to the second object from the first object and obtaining the corresponding physical address of the second object using the mapping of the global object space; and at least one runtime system connected to the first base and the second base, the at least one runtime system facilitating migration of agents and objects from at least the first base to at least the second base.

2. The distributed software system of claim 1, wherein each agent further comprises at least one subagent, each subagent residing on one base and comprising:

an object memory which stores objects in the subagent;

a task memory which stores task frames in the subagent;

program code for the agent to which the subagent belongs;

a subagent control storage comprising:

an agent identifier indicating the agent to which the subagent belongs;

an object table having a mapping which maps symbolic references of objects to corresponding physical addresses of said objects in the object memory;

a task stack which stores a plurality of task thread pointers in the task memory;

and wherein the at least one runtime system further comprises:

an agent manager for each base managing a plurality of subagent control storages of subagents residing on the corresponding base;

an object manager for each base managing a plurality of object memories for a plurality of subagents residing on the corresponding base;

an object serializer for each base serializing objects for transmitting the objects across the network to at least one base other than the corresponding base;

a task executer for each base reading program code, creating task stacks in task memories, and executing the program code;

a task serializer for each base serializing task stacks for transmitting the stacks across the network to at least one base other than the corresponding base;

a remote access controller for each base receiving remote object access messages from a task executer on at least one base other than the corresponding base and sending remote object access requests to at least one base other than the corresponding base; and a communication system coordinating physical communication between the computer machines.

3. The distributed software system of claim 2, wherein the program code is stored as class files in the subagent.

4. The distributed software system of claim 2, wherein the runtime system further facilitates migration of tasks from the first base to the second base.

5. The distributed software system of claim 1, wherein the first object is a task and the second object is a data object.

6. The distributed software system of claim 1, wherein the global object space is implemented using global identifiers for addressing each object.

7. The distributed software system of claim 1, wherein:
the first object is a first task residing within the protection domain of the at least one agent and executing within the first base; and
the second object is a second task residing within the protection domain of the at least one agent and executing within the second base, wherein the first task and the second task execute concurrently on the first and second bases, respectively, and within the same protection domain of the at least one agent.

8. The distributed software system of claim 1, wherein each base may provide the local address and computer resources to a plurality of agents simultaneously.

9. The distributed software system of claim 1, wherein the first base and the second base are located in heterogeneous computer machines.

10. A distributed software system for use with a plurality of computer machines connected as a network, the system comprising:
a plurality of bases, each base providing a local address space and computer resources on one of a plurality of computer machines;
at least one agent comprising a protection domain, wherein the protection domain of the at least one agent resides on at least one of the plurality of bases;
a plurality of objects contained within the protection domain of the at least one agent, a first object residing on a first base of the plurality of bases and a second object residing on a second base of the plurality of bases, wherein the first object on the first base may access the second object on the second base without knowledge of the physical address of the second object on the second base, wherein the access by the first object of the second object is a method call specifying at least one of an argument and a return value, wherein a symbolic reference to the at least one argument or return value may be passed to or returned from the called method to identify the at least one argument or return value, and wherein the physical address of the at least one argument or return value need not be passed to or returned from the called method to identify the at least one argunent or return value so as to render the method call network transparent; and
at least one runtime system connected to the first base and the second base, the at least one runtime system facilitating migration of agents and objects from at least the first base to at least the second base.

11. The distributed software system of claim 10, wherein the at least one agent further comprises a global object space, wherein the global object space includes a mapping of symbolic references of objects within the at least one agent to corresponding physical addresses of said objects, whereby the system permits the symbolic reference to the at least one argument or return value of the method call to be passed to or returned from the called method to identify the at least one argument or return value by obtaining a symbolic reference to the second object from the first object and obtaining the corresponding physical address of the second object using the mapping of the global object space.

12. The distributed software system of claim 11, wherein the global object space is implemented using global identifiers for addressing each object.

13. A distributed software system for use with a plurality of computer machines connected as a network, the system comprising:
at least one agent comprising a protection domain and a global object space, wherein the protection domain of the at least one agent resides on at least two of the plurality of computer machines; and
a plurality of objects contained within the protection domain of the at least one agent, the objects being selectively movable among the plurality of computer machines by a programmer of the system, a first object residing on a first of the plurality of computer machines and a second object residing on a second of the plurality of computer machines, wherein the global object space includes a mapping of symbolic references of objects within the at least one agent to corresponding physical addresses of said objects, whereby the first object on the first computer machine may access the second object on the second computer machine without knowledge of the physical address of the second object on the second computer machine by obtaining a symbolic reference to the second object from the first object and obtaining the corresponding physical address of the second object using the mapping of the global object space, and regardless of the selective movement of either the first object or the second object among the first and second computer machines.

14. The distributed software system of claim 13, wherein the first object is a task and the second object is a data object.

15. The distributed software system of claim 14, wherein the global object space is implemented using global identifiers for addressing each object.

16. The distributed software system of claim 13, wherein:
the first object is a first task residing within the protection domain of the at least one agent and executing within the first computer machine; and
the second object is a second task residing within the protection domain of the at least one agent and executing within the second computer machine, wherein the first task and the second task execute concurrently on the first and second computer machines, respectively, and within the same protection domain of the at least one agent.

17. The distributed software system of claim 13, further comprising:
a plurality of bases, each base providing a local address space and computer resources to at least one agent on one of the plurality of computer machines, wherein the at least one agent resides on at least one base.

18. The distributed software system of claim 17, wherein the at least one agent resides on at least a first base on the first computer machine and also on a second base on the second computer machine, and wherein the first object resides on the first base and the second object resides on the second base.

19. The distributed software system of claim 17, wherein each base may provide the local address and computer resources to a plurality of agents simultaneously.

20. The distributed software system of claim 17, wherein each base is implemented as an operating system-level process.

21. The distributed software system of claim 13, wherein the first computer machine and the second computer machine are heterogeneous.

22. A distributed software system for use with a plurality of computer machines connected as a network, the system comprising:

at least one agent comprising a protection domain, wherein the protection domain of the at least one agent resides on at least two of the plurality of computer machines; and a plurality of objects contained within the protection domain of the at least one agent, the objects being selectively movable among the at least two computer machines by a programmer of the system, a first object residing on a first of the at least two computer machines and a second object residing on a second of the at least two computer machines, wherein the first object on the first computer machine may access the second object on the second computer machine without knowledge of the physical address of the second object on the second computer machine, and regardless of the selective movement of either the first object or the second object among the first and second computer machines, and wherein the access by the first object of the second object is a method call specifying at least one of an argument and a return value, wherein a symbolic reference to the at least one argument or return value may be passed to or returned from the called method to identify the at least one argument or return value, and wherein the physical address of the at least one argument or return value need not be passed to or returned from the called method to identify the at least one argument or return value so as to render the method call network transparent.

23. The distributed software system of claim 22, wherein the at least one agent further comprises a global object space, wherein the global object space includes a mapping of symbolic references of objects within the at least one agent to corresponding physical addresses of said objects, whereby the system permits the symbolic reference to the at least one argument or return value of the method call to be passed to or returned from the called method to identify the at least one argument or return value by obtaining a symbolic reference to the second object from the first object and obtaining the corresponding physical address of the second object using the mapping of the global object space.

24. The distributed software system of claim 23, wherein the global object space is implemented using global identifiers for addressing each object.

25. A distributed software system for use with a plurality of computer machines connected as a network, the system comprising:

a plurality of bases, each base providing a local address space and computer resources on one of the plurality of computer machines;

at least one agent residing on a first base and comprising a protection domain, wherein the protection domain of the at least one agent resides on at least one of the plurality of bases;

at least one object residing within the protection domain of the at least one agent and including at least one anchored object, the at least one anchored object being instantiated on the first base from a base-dependent class and which is permanently unable to be moved from the first base to any other base; and at least one runtime system connected to the plurality of bases, the at least one runtime system including a communication system which facilitates migration of agents and objects among the plurality of bases.

26. The distributed software system of claim 25, wherein each agent further comprises at least one subagent, each subagent residing on one base and comprising:

an object memory which stores objects in the subagent;

a task memory which stores task frames in the subagent;

program code for the agent to which the subagent belongs;

a subagent control storage comprising:
   an agent identifier indicating the agent to which the subagent belongs;
   an object table having a mapping which maps symbolic references of objects to corresponding physical addresses of said objects in the object memory;
   a task stack which stores a plurality of task thread pointers in the task memory;

and wherein the at least one runtime system further comprises:

an agent manager for each base managing a plurality of subagent control storages of subagents residing on the corresponding base;

an object manager for each base managing a plurality of object memories for a plurality of subagents residing on the corresponding base;

an object serializer for each base serializing objects for transmitting the objects across the network to at least one base other than the corresponding base;

a task executer for each base reading program code, creating task stacks in task memories, and executing the program code;

a task serializer for each base serializing task stacks for transmitting the stacks across the network to at least one base other than the corresponding base;

a remote access controller for each base receiving remote object access messages from a task executer on at least one base other than the corresponding base and sending remote object access requests to at least one base other than the corresponding base; and a communication system coordinating physical communication between the computer machines.

27. The distributed software system of claim 26, wherein the program code is stored as class files in the subagent.

28. The distributed software system of claim 26, wherein the runtime system further facilitates migration of tasks among the plurality of bases.

29. The distributed software system of claim 25, wherein the at least one agent further comprises a first subagent residing on a first base and a second subagent simultaneously residing on a second base, and wherein the at least one agent migrates in part to a third base, whereby the first subagent remains on the first base and the second subagent migrates to the third base.

30. The distributed software system of claim 25, wherein the at least one agent further comprises a first subagent residing on a first base and a second subagent simultaneously residing on a second base, and wherein the at least one agent migrates in whole to a third base, whereby both the first and second subagent merge and migrate to the third base as one subagent.

31. The distributed software system of claim 25, wherein the at least one agent may be instructed to migrate from the first base to a second base by a first migrate method, whereby the at least one anchored object remains on the first base while the remainder of the at least one agent migrates to the second base.

32. The distributed software system of claim 31, wherein the at least one agent may be instructed to migrate from the first base to the second base by a second migrate method, whereby the at least one anchored object on the first base is abandoned while the remainder of the at least one agent migrates to the second base.

33. The distributed software system of claim 25, wherein the at least one agent may be instructed to migrate from the first base to a second base by a first migrate method, whereby the at least one anchored object is abandoned while the remainder of the at least one agent migrates to the second base.

34. The distributed software system of claim 25, further comprising at least one pinned object which is temporarily unable to be moved from the first base to any other base, the at least one pinned object residing in the at least one agent, and wherein the at least one agent may be instructed to migrate from the first base to a second base by a first migrate method, whereby the at least one pinned object remains on the first base while the remainder of the at least one agent migrates to the second base.

35. The distributed software system of claim 34, wherein the at least one agent may be instructed to migrate from the first base to the second base by a second migrate method, whereby the at least one pinned object on the first base is abandoned while the remainder of the at least one agent migrates to the second base.

36. The distributed software system of claim 25, further comprising at least one pinned object which is temporarily unable to be moved from the first base to any other base, the at least one pinned object residing in the at least one agent, and wherein the at least one agent may be instructed to migrate from the first base to a second base by a first migrate method, whereby the at least one pinned object on the first base is abandoned while the remainder of the at least one agent migrates to the second base.

37. The distributed software system of claim 36, wherein the at least one pinned object may be unpinned so as to permit the unpinned object to be moved from the first base to any other base, whereby the unpinned object on the first base may migrate to the second base when the at least one agent is instructed to migrate from the first base to the second base.

38. The distributed software system of claim 25, wherein a first agent residing on a first base possesses a reference to an object in a second agent residing on a second base, and wherein after the first agent migrates to a third base with the first agent reference, the first agent reference remains valid.

39. The distributed software system of claim 25, wherein a first agent residing on a first base possesses a reference to a first object in a second agent residing on a second base, wherein after the second agent migrates to a third base with the first object, a second object is created for permitting forwarding access from the first base to the actual location of the first object residing on the third base so that the first agent reference remains valid.

40. A distributed software system for use with a plurality of computer machines connected as a network, the system comprising:
  a plurality of bases, each base providing a local address space and computer resources on one of the plurality of computer machines;
  at least one agent comprising a protection domain, wherein the protection domain of the at least one agent resides on at least one of the plurality of bases;
  at least one object residing within the protection domain of the at least one agent;
  at least one runtime system connected to the plurality of bases, the at least one runtime system including a communication system which facilitates migration of agents and objects among the plurality of bases;
  a first method calling protocol for calling, from a first base, a method to a first object residing on a second base, wherein the method is transmitted from the first base to the second base and wherein the method is executed on the second base where the first object resides; and
  a second method calling protocol for calling, from the first base, a method to a second object residing on the second base, wherein the method is executed on the first base using method code on the first base corresponding to the second object method and a remote reference to the second object on the second base.

41. The distributed software system of claim 40, wherein the method code on the first base corresponding to the second object method is stored in a class file on the first base.

42. A method for implementing a network-centric computer software programming system for a network comprising a plurality of computer machines, the method comprising the steps of:
  defining a plurality of object-oriented classes including an object class, an agent class, a base class and a task class;
  defining an object migrate method in the object class that migrates a selected object instance to a location specified with the base class;
  defining an agent migrate method in the agent class that migrates a selected agent process to a location specified with the base class, including migration of all object instances and task instances within the agent;
  instantiating a first agent process according to the agent class, the first agent process including a plurality of task instances and object instances and distributed among the plurality of computer machines;
  performing the object migrate method and the agent migrate method within the first agent process;
  instantiating a first base and a second base according to the base class;
  instantiating a task according to the task class on the first base;
  instantiating an object according to the object class on the second base, the object having a method; and
  defining a method calling protocol wherein calling, from the task on the first base, the method of the object on the second base includes executing the method on the first base using method code on the first base corresponding to the object method and a remote reference to the object on the second base.

43. The method for implementing a network-centric computer software programming system for a network of computer machines according to claim 42, further comprising the step of defining a task migrate method in the task class that migrates a selected task represented in a task instance to a location specified with the base class.

44. The method for implementing a network-centric computer software programming system for a network of computer machines according to claim 42, further comprising the step of instantiating a plurality of base instances according to the base class, wherein the first agent process executes on at least two bases simultaneously, each base being specified with one of the plurality of base instances.

45. The method for implementing a network-centric computer software programming system for a network of computer machines according to claim 42, further comprising the step of instantiating a plurality of base instances according to the base class, wherein object instances of the first agent process reside on at least two bases simultaneously, each base being specified with one of the plurality of base instances.

46. The method for implementing a network-centric computer software programming system for a network of computer machines according to claim 42, further comprising the step of instantiating a plurality of base instances according to the base class, wherein task instances of the first agent process execute on at least two bases simultaneously, each base being specified with one of the plurality of base instances.

47. The method for implementing a network-centric computer software programming system for a network of computer machines according to claim 42, further comprising the steps of:
   instantiating a first base instance according to the base class; and
   instantiating a second agent process according to the agent class, wherein the first and second agent processes execute simultaneously on a base specified with the first base instance.

48. The method for implementing a network-centric computer software programming system for a network of computer machines according to claim 42, further comprising the step of defining a partial agent migrate method in the agent class that migrates a selected part of an agent process residing on a first base specified with a first base instance to a second base specified with a second base instance, including migration of all object instances and task instances on the first base within the selected part of the agent process.

49. The method for implementing a network-centric computer software programming system for a network of computer machines according to claim 44, further comprising the step of defining a whole agent migrate method in the agent class that migrates a selected whole agent process residing on a first base specified with a first base instance to a second base specified with a second base instance, including migration of all object instances and task instances within the selected agent process.

50. The method for implementing a network-centric computer software programming system for a network of computer machines according to claim 42, wherein the method code on the first base corresponding to the object method is stored in a class file on the first base.

51. The method for implementing a network-centric computer software programming system for a network of computer machines according to claim 52, wherein at least a subset of the plurality of computer machines are heterogeneous.

52. A method for implementing a network-centric computer software programming system for a network comprising a plurality of computer machines, the method comprising the steps of:
   defining a plurality of object-oriented classes including an object class, an agent class, a base class and a task class;
   defining an object migrate method in the object class that migrates a selected object instance to a location specified with the base class;
   defining an agent migrate method in the agent class that migrates a selected agent process to a location specified with the base class, including migration of all object instances and task instances within the agent;
   instantiating a first agent process according to the agent class, the first agent process including a plurality of task instances and object instances and distributed among the plurality of computer machines;
   performing the object migrate method and the agent migrate method within the first agent process;
   instantiating a first base according to the base class;
   instantiating a second agent process according to the agent class, the second agent process residing at least in part on the first base;
   instantiating an anchored object from a base-dependent object class, the anchored object being associated with a second agent process located on a first base specified with a base instance and being unable to be moved to other bases; and
   defining an agent migrate method in the agent class that migrates the second agent process to another base specified with a base instance, including migration of all task instances and object instances within the second agent process except for the anchored object.

53. A method for implementing a network-centric computer software programming system for a network comprising a plurality of computer machines, the method comprising the steps of:
   defining a plurality of object-oriented classes including an object class, an agent class, a base class and a task class;
   defining an object migrate method in the object class that migrates a selected object instance to a location specified with the base class;
   defining an agent migrate method in the agent class that migrates a selected agent process to a location specified with the base class, including migration of all object instances and task instances within the agent;
   instantiating a first agent process according to the agent class, the first agent process including a plurality of task instances and object instances and distributed among the plurality of computer machines;
   performing the object migrate method and the agent migrate method within the first agent process;
   instantiating a first base according to the base class;
   instantiating a second agent process according to the agent class, the second agent process residing at least in part on the first base;
   instantiating a first object according to the object class, the first object residing within the second agent process;
   pinning the first object to the first base; and
   defining an agent migrate method in the agent class that migrates the second agent process from the first base to another base specified with the base class, including migration of all task instances and object instances within the second agent process except for the pinned first object.

54. A method for implementing a network-centric computer software programming system for a network comprising a plurality of computer machines, the method comprising the steps of:
   defining a plurality of object-oriented classes including an object class, an agent class, a base class and a task class;
   defining an object migrate method in the object class that migrates a selected object instance to a location specified with the base class;
   defining an agent migrate method in the agent class that migrates a selected agent process to a location specified with the base class, including migration of all object instances and task instances within the agent;
   instantiating a first agent process according to the agent class, the first agent process including a plurality of task instances and object instances and distributed among the plurality of computer machines;

performing the object migrate method and the agent migrate method within the first agent process;

instantiating a first base and a second base according to the base class;

instantiating a task according to the task class on the first base;

instantiating an object according to the object class on the second base, the object having a method; and defining a method calling protocol wherein calling, from the task on the first base, the method of the object on the second base includes transmitting the method from the first base to the second base and executing the method on the second base.

55. A distributed software system for use with a plurality of computer machines connected as a network, the system comprising:

a plurality of bases, each base providing a local address space and computer resources on one of the plurality of computer machines;

at least one agent residing on a first base and comprising a protection domain, wherein the protection domain of the at least one agent resides on at least one of the plurality of bases;

at least one object residing within the protection domain of the at least one agent and including at least one pinned object which is temporarily unable to be moved from the first base to any other base; and at least one runtime system connected to the plurality of bases, the at least one runtime system including a communication system which facilitates migration of agents and objects among the plurality of bases.

56. The distributed software system of claim 55, wherein each agent further comprises at least one subagent, each subagent residing on one base and comprising:

an object memory which stores objects in the subagent;

a task memory which stores task frames in the subagent;

program code for the agent to which the subagent belongs;

a subagent control storage comprising:

an agent identifier indicating the agent to which the subagent belongs;

an object table having a mapping which maps symbolic references of objects to corresponding physical addresses of said objects in the object memory;

a task stack which stores a plurality of task thread pointers in the task memory;

and wherein the at least one runtime system further comprises:

an agent manager for each base managing a plurality of subagent control storages of subagents residing on the corresponding base;

an object manager for each base managing a plurality of object memories for a plurality of subagents residing on the corresponding base;

an object serializer for each base serializing objects for transmitting the objects across the network to at least one base other than the corresponding base;

a task executer for each base reading program code, creating task stacks in task memories, and executing the program code;

a task serializer for each base serializing task stacks for transmitting the stacks across the network to at least one base other than the corresponding base;

a remote access controller for each base receiving remote object access messages from a task executer on at least one base other than the corresponding base and sending remote object access requests to at least one base other than the corresponding base; and a communication system coordinating physical conunu- nication between the computer machines.

57. The distributed software system of claim 56, wherein the program code is stored as class files in the subagent.

58. The distributed software system of claim 56, wherein the runtime system further facilitates migration of tasks among the plurality of bases.

59. The distributed software system of claim 55, wherein the at least one agent further comprises a first subagent residing on a first base and a second subagent simulta- neously residing on a second base, and wherein the at least one agent migrates in part to a third base, whereby the first subagent remains on the first base and the second subagent migrates to the third base.

60. The distributed software system of claim 55, wherein the at least one agent further comprises a first subagent residing on a first base and a second subagent simulta- neously residing on a second base, and wherein the at least one agent migrates in whole to a third base, whereby both the first and second subagent merge and migrate to the third base as one subagent.

61. The distributed software system of claim 55, further comprising at least one anchored object, the at least one anchored object being instantiated on the first base from a base-dependent class and which is permanently unable to be moved from the first base to any other base, the at least one anchored object residing in the at least one agent, and wherein the at least one agent may be instructed to migrate from the first base to a second base by a first migrate method, whereby the at least one anchored object remains on the first base while the remainder of the at least one agent migrates to the second base.

62. The distributed software system of claim 61, wherein the at least one agent may be instructed to migrate from the first base to the second base by a second migrate method, whereby the at least one anchored object on the first base is abandoned while the remainder of the at least one agent migrates to the second base.

63. The distributed software system of claim 55, further comprising at least one anchored object, the at least one anchored object being instantiated on the first base from a base-dependent class and which is permanently unable to be moved from the first base to any other base, the at least one anchored object residing in the at least one agent, and wherein the at least one agent may be instructed to migrate from the first base to a second base by a first migrate method, whereby the at least one anchored object is abandoned while the remainder of the at least one agent migrates to the second base.

64. The distributed software system of claim 55, wherein the at least one agent may be instructed to migrate from the first base to a second base by a first migrate method, whereby the at least one pinned object remains on the first base while the remainder of the at least one agent migrates to the second base.

65. The distributed software system of claim 64, wherein the at least one agent may be instructed to migrate from the first base to the second base by a second migrate method, whereby the at least one pinned object on the first base is abandoned while the remainder of the at least one agent migrates to the second base.

66. The distributed software system of claim 55, wherein the at least one agent may be instructed to migrate from the first base to a second base by a first migrate method, whereby the at least one pinned object on the first base is abandoned while the remainder of the at least one agent migrates to the second base.

67. The distributed software system of claim 66, wherein the at least one pinned object may be unpinned so as to permit the unpinned object to be moved from the first base to any other base, whereby the unpinned object on the first base may migrate to the second base when the at least one agent is instructed to migrate from the first base to the second base.

68. The distributed software system of claim 55, wherein a first agent residing on a first base possesses a reference to an object in a second agent residing on a second base, and wherein after the first agent migrates to a third base with the first agent reference, the first agent reference remains valid.

69. The distributed software system of claim 55, wherein a first agent residing on a first base possesses a reference to a first object in a second agent residing on a second base, wherein after the second agent migrates to a third base with the first object, a second object is created for permitting forwarding access from the first base to the actual location of the first object residing on the third base so that the first agent reference remains valid.

* * * * *